United States Patent
Yamamoto et al.

(10) Patent No.: US 6,610,809 B1
(45) Date of Patent: Aug. 26, 2003

(54) POLYMER, PRODUCING METHOD THEREOF, AND PHOTOREFRACTIVE COMPOSITION

(75) Inventors: Michiharu Yamamoto, Carlsbad, CA (US); Seth R. Marder, Tucson, AZ (US); Bernard Kippelen, Tucson, AZ (US)

(73) Assignees: Nitto Denko Corporation, Osaka (JP); Arizona Board of Regents on behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 10/113,127

(22) Filed: Mar. 29, 2002

(51) Int. Cl.$^7$ ................................................ C08F 18/00
(52) U.S. Cl. ................... 526/292.2; 526/259; 526/260; 526/263; 526/270; 526/288; 526/292.1; 526/292.3; 526/292.4; 526/292.5; 526/257; 526/298; 526/328.5
(58) Field of Search ................................. 526/257, 259, 526/260, 263, 270, 288, 292.1, 292.2, 292.3, 292.4, 292.5, 298, 328.5

(56) References Cited

U.S. PATENT DOCUMENTS

| 5,807,937 A | 9/1998 | Matyjaszewski et al. |
|---|---|---|
| 6,090,332 A | 7/2000 | Marder et al. |

FOREIGN PATENT DOCUMENTS

| JP | 07-318992 | 12/1995 |
|---|---|---|
| JP | 10-333195 | 12/1998 |
| JP | 2001-115124 | 4/2002 |

OTHER PUBLICATIONS

Park et al. Polymers for Advanced Technologies (2000), 11(7), 349–358.*
Hendrickx et al. Proceedings of SPIE (2000), 4104, 130–139.*
Hendrickx et al. Materials Science and Engineering (2001) C 18(1–2), 25–35.*
Lee et al. Polymeric Materials Science and Engineering (1997), 76, 314–315.*
Zhao et al. Chem. Mater. (1995), 7(6), 1237–42.*
Ewert et al. Proceedings of SPIE (1998), 3471, 134–141.*
K. Tamura, et al., New polymeric material containing the tricyanovinylcarbazole group for photorefractive applications, Appl. Phys. Lett. 60 (15), Apr. 13, 1992, pp. 1803–1805.
T. Kawakami, et al., Photoinduced refractive index change in a photoconductive electro–optic polymer, Appl. Phys. Lett. 62 (18), May 3, 1993, pp. 2167–2169.
K. Meerholz, et al. A photorefractive polymer with high optical gain and diffraction efficiency near 100%, Nature vol. 371, Oct. 6, 1994, pp. 4997–4500.
Hisaya Sato, et al., Synthesis and Characterization of Photorefractive Polymeric Material with high Charge Mobility, Technical Report of IEICB (1005–10), pp. 43–45.
Jin–Shan Wang, et al., Controlled/"Living" Radical Polymerization. Halogen Atom Transfer Radical Polymerization Promoted by a Cu(I)/Cu(II) Redox Process, Macromolecules, vol. 28 No. 23, 1995, pp. 7901–7910.
Tsuyoshi Ando, et al., Living Radical Polymerization of Methyl Methacrylate with Ruthenium Complex: Formation of Polymers with Controlled Molecular Weights and Very Narrow Distributions, Macromolecules, vol. 29, No. 3, 1996, pp. 1070–1072.
M.A. Díaz–García, et al. Photorefractive Properties of Poly(N–vinyl carbazole)–Based Composites for HighSpeed Applications, Chem. Mater., vol. 11 No. 7, 1999, pp. 1784–1791.
Eric Hendrickx, et al., Photoconductive properties of PVK–based photorefractive polymer composites doped with fluorinated styrene chromophores, J. Mater., Chem., 1999, 9, 2251–2258.
Yi–Wang Chen, et al., Photorefractive Effect in a New Composite Based on Bifunctional Host Polymer, Journal of Applied Polymer Science, vol. 77, 189–194 (2000).
David Van Steenwinckel, et al., Fully Functionalized Photorefractive Polymethacrylates with net Gain at 780nm, Macromolecules, vol. 33, No. 11, 2000, 4074–4079.
E. Hattemer, et al., Poly(4–Diphenyl–Aminostyrenes): New Polymers for Electrooptics, Polymer Preprints 2000, 41(1), 785–786.
Timothy E. Patten, et al., Radical Polymerization Yielding Polymers with $M_w/M_n$~1.05 by Homogeneous Atom Transfer Radical Polymerization, Department of Chemistry Carnegie Mellon University Pittsburgh, PA, pp. 575–576.

* cited by examiner

Primary Examiner—Helen L. Pezzuto
(74) Attorney, Agent, or Firm—Knobbe Martens Olson & Bear, LLP

(57) ABSTRACT

A photorefractive composition comprising a polymer prepared by living radical polymerization, wherein: the living radical polymerization is carried out using a monomer, a polymerization initiator, transition metal catalyst and a ligand capable of reversibly forming a complex with the transition metal catalyst, and the polymer comprises at least one of a repeat unit including a moiety having charge transport ability and a repeat unit including a moiety having non-linear-optical ability.

46 Claims, No Drawings

POLYMER, PRODUCING METHOD THEREOF, AND PHOTOREFRACTIVE COMPOSITION

FIELD OF THE INVENTION

The invention relates to a polymer, producing method thereof, and photorefractive composition. More particularly, the invention relates to polymers and copolymers that include functional groups that provide photorefractive capabilities, and to methods of making such polymers.

BACKGROUND OF THE INVENTION

Photorefractivity is a phenomenon in which the refractive index of a material can be altered by changing the electric field within the material, such as by laser beam irradiation. The change of refractive index is achieved by a series of steps, including: (1) charge generation by laser irradiation, (2) charge transport, resulting in separation of positive and negative charges, and (3) trapping of one type of charge (charge delocalization), (4) formation of a non-uniform internal electric field (space-charge field) as a result of charge delocalization, and (5) refractive index change induced by the non-uniform electric field.

Therefore, good photorefractive properties can be seen only for materials that combine good charge generation, good charge transport, or photoconductivity, and good electro-optical activity.

Photorefractive materials have many promising applications, such as high-density optical data storage, dynamic holography, optical image processing, phase conjugated mirrors, optical computing, parallel optical logic, and pattern recognition.

Originally, the photorefractive effect was found in a variety of inorganic electro-optical (EO) crystals, such as $LiNbO_3$. In these materials, the mechanism of the refractive index modulation by the internal space-charge field is based on a linear electro-optical effect.

In 1990 and 1991, the first organic photorefractive crystal and polymeric photorefractive materials were discovered and reported. Such materials are disclosed, for example, in U.S. Pat. No. 5,064,264, to Ducharme et al. Organic photorefractive materials offer many advantages over the original inorganic photorefractive crystals, such as large optical nonlinearities, low dielectric constants, low cost, lightweight, structural flexibility, and ease of device fabrication. Other important characteristics that may be desirable depending on the application include sufficiently long shelf life, optical quality, and thermal stability. These kinds of active organic polymers are emerging as key materials for advanced information and telecommunication technology.

In recent years, efforts have been made to optimize the properties of organic, and particularly polymeric, photorefractive materials. As mentioned above, good photorefractive properties depend upon good charge generation, good charge transport, also known as photoconductivity, and good electro-optical activity. Various studies that examine the selection and combination of the components that give rise to each of these features have been done. The photoconductive capability is frequently provided by incorporating materials containing carbazole groups. Phenyl amine groups can also be used for the charge transport part of the material.

Non-linear optical ability is generally provided by including chromophore compounds, such as an azo-type dye, which can absorb photon radiation. The chromophore may also provide adequate charge generation. Alternatively, a material known as a sensitizer may be added to provide or boost the mobile charge required for photorefractivity to occur. Many materials, including wide range of dyes and pigments, can serve as sensitizers.

The photorefractive composition may be made simply by mixing the molecular components that provide the individual properties required into a host polymer matrix. However, most compositions prepared in this way are not stable over time, because phase separation tends to occur as the components crystallize or phase separate.

Efforts have been made, therefore, to make polymers that include one or more of the active components in the polymer structure.

A major improvement was to replace the inert polymer matrix by the photoconductive polymer poly(N-vinylcarbazole) (PVK). This allowed the concentration of the charge-transport agent to be increased, while completely excluding crystallization of the carbazole groups. This breakthrough, achieved at the University of Arizona, is reported by N. Peyghambarian et al. (*Nature*, 1994, 371, 497).

In this case, a photorefractive composition was made by adding an azo dye (DMNPAA; 2,5-dimethyl-4-(p-nitrophenylazo) anisole) as chromophore, and trinitrofluorenone (TNF) as sensitizer. The resulting compositions showed almost 100% diffraction efficiency at laser intensity of 1 W/$cm^2$ and 90 V/$\mu$m biased voltage. The response time was slow, however, at over 100 msec.

To achieve good photorefractivity, materials are typically doped with large concentrations of chromophore, such as 25 wt % or more. Thus, crystallization and phase separation of the strongly dipolar chromophore remain a major problem.

To completely eliminate the instability caused by phase separation, it has been recognized that it would be desirable to prepare fully functionalised photorefractive polymers, that is, polymers in which both the photoconductivity and the non-linear optical capability reside within the polymer itself.

Building on the original University of Arizona work, efforts have been made to develop fully functional photorefractive polymers, as well as to speed up the response time. For example, PVK polymers in which some of the carbazole groups are tricyanovinylated have been made (N. Peyghambarian et al., *Applied Phys. Lett.*, 1992, 60, 1803). However, the photoconductivity of this polymer was reported as only 0.98 pS/cm and the diffraction efficiency was less than 1%, too low to show good photorefractivity. Also, the polydispersity of the polymer was high, at 3.3. Subsequently, the same group has reported PVK-based materials with an amazing response time of 4 msec, and a very high photoconductivity of 2,800 pS/cm (N. Peyghambarian et al., *J. Mater. Chem.*, 1999, 9, 2251).

A number of efforts at materials improvement have used methacrylate-based polymers and copolymers that include photoconductive and chromophore side groups. A paper by T. Kawakami and N. Sonoda, (*Applied Phys. Lett.*, 1993, 62, 2167.) discloses acrylate-based polymers containing dicyanovinylideneyl phenylamines as charge transport groups. The diffraction efficiency was reported as around 0.01%.

Japanese Patent Application laid-open JP-A 1995-318992, to Hitachi Ltd. discloses acrylate-based polymers and copolymers made by conventional polymerization techniques and containing charge transport and non-linear-optical groups, but gives no photorefractive performance data.

A report by H. Sato et al., (Technical report of IEICE., 1995, OME-95-53, OPE95-94, 43) describes the preparation of several copolymers having both charge transport components and non-linear optical components in the side groups of the copolymer. However, the charge transport speeds seem to be too slow for good photorefractive materials. The polymers are reported to have polydispersity in the range about 2.3–2.9.

Japanese Patent Application Laid-open JP-A 1998-333195, to Showa Denko, discloses acrylate-based polymers incorporating triphenylamine groups as charge transport agents. Fast response times (50 msec. at 70 V/$\mu$m biased voltage) and good polydispersity (1.58) are reported, although there is no description or data regarding diffraction efficiency.

A paper by Van Steenwickel et al. (*Macromolecules*, 2000, 33, 4074) describes acrylate-based polymers that include carbazole-based side chains and several stilbene-type side chains. The paper cites a high diffraction efficiency of 60% at 58 V/$\mu$m, but a slow response time of the sub-second order. Poly dispersity of between 2.5 and 3.8 is reported.

A paper by Y. Chen et al. (*Modern Optics*, 1999, 46, 1003) discusses a methacrylate polymer that has both carbazole-type side chains to provide charge transport capability and nitrophenyl azo-type side chains to provide non-linear optical capability. The materials again show slow response times of over 20 sec.

None of the materials described above achieves the optimum combination of a high diffraction efficiency with a fast response time, long-term stability and easy processability. Thus, there remains a need for photorefractive compositions that combine these attributes.

In recent years, a new type of polymerization, termed living radical polymerization, has been developed for polymerization of functional monomers, including methacrylate, and styrene derivatives. Living radical polymerization differs from conventional radical polymerization in that the polymer growth terminals can be temporarily protected by protection bonding. This enables polymerization to be well controlled, including being stopped and started at will.

This process can be used to prepare homopolymers and copolymers, including block copolymers. Details of the living radical polymerization method are described in the literature. They may be found, for example, in the following papers:

1. T. Patten et al., "Radical polymerization yielding polymers with Mw/Mn ~1.05 by homogeneous atom transfer radical polymerization", *Polymer Preprints*, 1996, 37, 575.
2. Matyjasewski et al., "Controlled/living radical polymerization. Halogen atom transfer radical polymerization promoted by a Cu(I)/Cu(II) redox process", *Macromolecules*, 1995, 28, 7901.
3. M. Sawamoto et al., "Ruthenium-mediated living radical polymerization of methyl methacrylate", *Macromolecules*, 1996, 29, 1070.

Living radical polymerization is also described in U.S. Pat. No. 5,807,937 to Carnegie-Mellon University, which is incorporated herein by reference in its entirety.

As an example of block copolymers prepared by living radical polymerization, novel styrene and butyl acrylate block copolymers for pressure sensitive adhesives have been reported (JP-A 2001-115124, M. Yamamoto et al.). Such block copolymers could not be prepared by conventional polymerization methods.

The only example known to the present inventors of photorefractive polymer preparation by living radical polymerization is in a paper by E. Hattemer et al. (*Polymer Preprints*, Am. Chem. Soc., Div. Polym. Chem., 2000, 41, 785). This reference discloses the polymerization of a triphenylamine-type styrene monomer, using a phenylethoxy-tetramethylpiperidine (TEMPO-type) initiator. The resulting polymers have low polydispersities of 1.2–1.4. No photorefractive or electro-optical performance data are reported in the citation.

SUMMARY OF THE INVENTION

The object of the present invention is to provide a photorefractive composition which exhibits high photoconductivity, a polymer which is desirably used for the photorefractive composition, and producing method thereof.

A first aspect of the present invention is a polymer which is represented by a formula selected from the group consisting of formulae (I), (II), (III) and (IV):

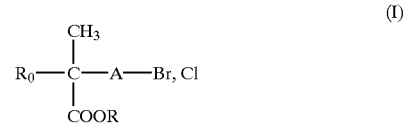

wherein $R_0$ represents a hydrogen atom or alkyl group with up to 10 carbons; R is selected from the group consisting of a hydrogen atom, a linear alkyl group with up to 10 carbons, a branched alkyl group with up to 10 carbons, and an aromatic group with up to 10 carbons; A represents a repeating structure comprising at least one of the below repeating unit 1 and repeating unit 2;

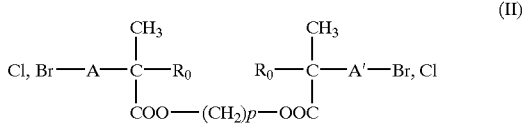

wherein $R_0$ represents each independently a hydrogen atom or alkyl group with up to 10 carbons; p is an integer of 2 to 6; A and A' represents each independently a repeating structure comprising at least one of the below repeating unit 1 and repeating unit 2;

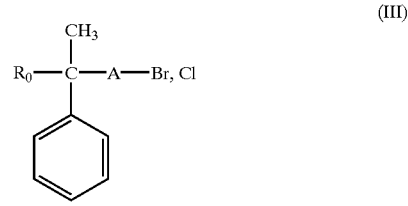

wherein $R_0$ represents a hydrogen atom or alkyl group with up to 10 carbons; A represents a repeating structure comprising at least one of the below repeating unit 1 and repeating unit 2;

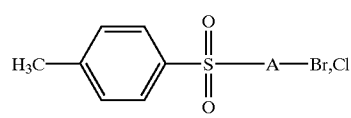

(IV)

wherein A represents a repeating structure comprising at least one of the below repeating unit 1 and repeating unit 2;

repeating unit 1

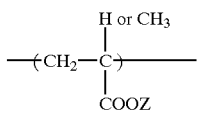

repeating unit 2

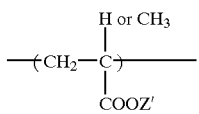

wherein Z is represented by a structure selected from the group consisting of structures (i), (ii) and (iii); and Z' is represented by formula (0);

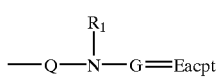

formula (0)

wherein Q represents an alkylene group, with or without a hetero atom; such as oxygen or sulfur, and preferably Q is an alkylene group represented by $(CH_2)p$; where p is an integer of about 2 to 6; $R_1$ is selected from the group consisting of a hydrogen atom, a linear alkyl group with up to 10 carbons, a branched alkyl group with up to 10 carbons, and an aromatic group with up to 10 carbons, and preferably $R_1$ is an alkyl group which is selected from methyl, ethyl, propyl, butyl, pentyl and hexyl; G is a group having a bridge of π-conjugated bond; and Eacpt is an electron acceptor group;

wherein the structures (i), (ii) and (iii) are:

Structure (i)

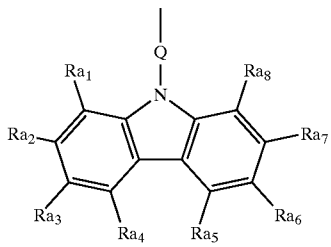

wherein Q represents an alkylene group, with or without a hetero atom, such as oxygen or sulfur, and preferably Q is an alkylene group represented by $(CH_2)p$; where p is an integer of about 2 to 6; and wherein $Ra_1$, $Ra_2$, $Ra_3$, $Ra_4$, $Ra_5$, $Ra_6$, $Ra_7$, and $Ra_8$ are independently selected from the group consisting of a hydrogen atom, a linear alkyl group with up to 10 carbons, a branched alkyl group with up to 10 carbons, and an aromatic group with up to 10 carbons;

Structure (ii)

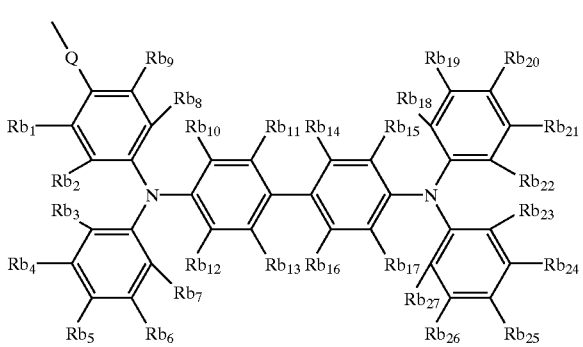

wherein Q represents an alkylene group, with or without a hetero atom, such as oxygen or sulfur, and preferably Q is an alkylene group represented by $(CH_2)p$; where p is an integer of about 2 to 6; and wherein $Rb_1$–$Rb_{27}$ are independently selected from the group consisting of a hydrogen atom, a linear alkyl group with up to 10 carbons, a branched alkyl group with up to 10 carbons, and an aromatic group with up to 10 carbons; and Structure (iii)

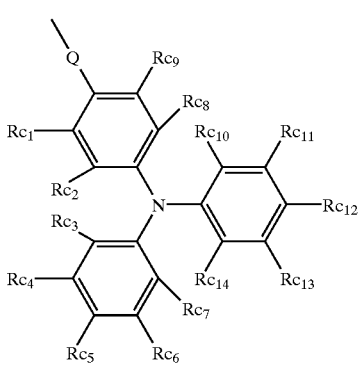

wherein Q represents an alkylene group, with or without a hetero atom, such as oxygen or sulfur, and preferably Q is an alkylene group represented by $(CH_2)p$; where p is an integer of about 2 to 6, and wherein $Rc_1$–$Rc_{14}$ are independently selected from the group consisting of a hydrogen atom, a linear alkyl group with up to 10 carbons, a branched alkyl group with up to 10 carbons, and an aromatic group with up to 10 carbons.

A second aspect of the present invention is a method for producing a polymer comprising polymerizing a monomer by a living radical polymerization technique, wherein the monomer comprises a structure selected from the group consisting of the above structures (i), (ii) and (iii).

A third aspect of the present invention is a method for producing a polymer comprising polymerizing a monomer by a living radical polymerization technique, wherein the monomer comprises a structure represented by the above formula (0).

A fourth aspect of the present invention is a method for producing a polymer comprising copolymerizing at least a first monomer and a second monomer by a living radical polymerization technique, wherein the first monomer comprises a structure selected from the group consisting of the above structures (i), (ii) and (iii), and wherein the second monomer comprises a structure represented by the above formula (0).

A fifth aspect of the present invention is a composition comprising a sensitizer and a polymer according to the first aspect of the present invention, wherein the composition exhibits photorefractive ability.

A sixth aspect of the present invention is a composition comprising a polymer prepared by living radical polymerization, wherein: (a) the living radical polymerization is carried out using a monomer, a polymerization initiator, transition metal catalyst and a ligand capable of reversibly forming a complex with the transition metal catalyst, (b) the polymer comprises at least one of a first repeat unit including a moiety having charge transport ability and a second repeat unit including a moiety having non-linear-optical ability, and (c) the composition exhibits photorefractive ability. One or both of the photoconductive (charge transport) and non-linear optical components are incorporated into the chemical structure of the polymer itself, typically as side groups.

The composition differs from photorefractive compositions previously known in the art in several points. In a first point, it is prepared by living radical polymerization, preferably by using a transition metal catalyst.

In a second point, the composition provides high photoconductivity compared with prior art photoconductive materials, and/or one or more other advantageous properties, such as high diffraction efficiency, fast response time, low polydispersity, and comparatively low glass transition temperature. Furthermore these properties can typically be provided in conjunction with one or more other desirable attributes, such as stability, that is, resistance to phase separation, low viscosity, and excellent handling and processing capability.

In a third point, the composition comprises a random copolymer or a block copolymer incorporating blocks containing the photoconductive side group and blocks containing the non-linear-optical (chromophore) side group.

In a fourth point, the composition is characterized by a low polydispersity compared with typical polymers, and combines low polydispersity with one or more good photorefractive properties, such as high diffraction efficiency, high photoconductivity and fast response time. Furthermore, as above, these properties can typically be provided in conjunction with one or more other desirable attributes, such as stability, low viscosity, and excellent handling and processing capability.

With respect to the first point of the invention, it was discovered by the inventors that living radical polymerization techniques could be adapted to provide polymers with improved properties for use in photorefractive compositions. Living radical polymerization technique by the inventors makes available to the art a number of innovative features, including use of acrylate-based monomers incorporating charge transport groups and/or non-linear-optical (chromophore) groups, use of transition metal catalyst systems for preparation of photorefractive materials, and use of a monomer incorporating a chromophore precursor group.

With respect to the second point of the invention, it was found by the inventors that photorefractive compositions of the present invention exhibit high photoconductivity. High photoconductivity is supposed to contribute to high response time. As explained in more detail below, photoconductivity is the increase in conductivity of a material when exposed to light. Conventional organic photorefractive materials typically exhibit photoconductivities in the range 0.01–1,000 pS/cm, with most having photoconductivity no higher than about 10 pS/cm. Materials of the present invention are typically able to exhibit higher photoconductivity of at least about 100 pS/cm, preferably about 200 pS/cm or more, and more preferably about 500 pS/cm or more.

To inventors' knowledge, the highest photoconductivity that has ever been reported for a photorefractive material is 2,800 pS/cm, in a PVK-type material. However materials with photoconductivity above 3,000 pS/cm have been produced by the inventors, and specifically as high as 3,500 pS/cm.

Also, unlike polycarbazole, which becomes viscous and sticky during processing, materials of the present invention retain their low viscosity and have excellent handling properties for standard device fabrication techniques, such as injection molding, extrusion, and various film-forming processes.

Furthermore, materials of the present invention combine exceptional photoconductivity with very fast response times, such as 50 ms or less.

With respect to the third point of the invention, the first photorefractive block copolymers in the art was developed by the inventors. The block copolymers of the invention can manifest essentially any combination of blocks containing units with photoconductive (charge transport) ability and blocks containing units with non-linear optical ability. For example, if A represents a polymer block that incorporates charge transport ability groups and B represents a polymer block that incorporates non-linear-optical ability groups, then the copolymers of the invention include any combinations of A and B units. As representative, but non-limiting examples, polymers of the forms A—B, B—A, A—B—A, B—A—B, and so on, are included.

Also included are copolymers that include more diverse monomer units, such as A1—A2—B, A1—B1—A2—B2 and so on, where A1 and A2 represent different types of A polymer and B1 and B2 represent different types of B polymer.

The block copolymers of the invention can be readily made by the adapted living radical polymerization techniques discovered by the inventors.

Random-type copolymers comprising at least two functional groups, a charge transport functional group and a non-linear optical functional group, are also provided, and can be readily made by the processes of the invention.

Both the random copolymers and the block copolymers disclosed herein provide the advantage of long-term stability, due to lower likelihood of phase separation or crystallization, compared with polymer materials in which the functionality is provided by adding functional materials in the form of dopants.

With respect to the fourth point of the invention, the polymers of the invention exhibit low polydispersity. As discussed in more detail below, polydispersity is a measure of the spread of molecular weights of the molecules in a polymer. In general, the lower the polydispersity, the more uniform are the bulk physical properties of the polymer, such as thermal and mechanical characteristics. This is an important feature for the performance of photorefractive compositions. Typically, polymers prepared by conventional techniques exhibit a polydispersity of greater than about 2.5. According to the present invention, materials that typically exhibit a polydispersity of about 2.5 or below, and preferably about 2.0 or below, are provided.

Furthermore, for polymers having the same chemical structure and average molecular weight, a polymer composition of low polydispersity exhibits a lower glass transition temperature than the corresponding composition of higher polydispersity. For example, typical glass transition temperature for the types of methacrylate polymers preferred for polymer compositions of the invention is about 90–120° C. when made by conventional polymerization techniques. When made by the living radical polymerization technique taught herein, the glass transition temperature of the polymer is typically between about 80° C. and 100° C. This is important, because a lower glass transition temperature tends to lead to better photorefractive performances, such as high photoconductivity, fast response time and high diffraction efficiency.

The comparatively lower Tg of polymers of the invention reduces the dependence on large amounts of plasticizer in the finished composition. This improves the handling properties of the composition and the long-term stability.

These materials of comparatively low polydispersity may be readily prepared by living radical polymerization technique of the invention.

DETAILED DESCRIPTION OF THE INVENTION

The photorefractive composition comprises a polymer matrix, and includes a component that provides photoconductive or charge transport ability and a component that provides non-linear optical ability. Optionally, the composition may also include other components as desired, such as sensitizer and plasticizer components.

One or both of the photoconductive and non-linear optical components are incorporated as functional groups into the polymer structure, typically as side groups.

The group that provides the charge transport or photoconductive functionality may be any group known in the art to provide such capability. If this group is to be attached to the polymer matrix as a side chain, then the group should be capable of incorporation into a monomer that can be polymerized to form the polymer matrix of the composition.

Preferred photoconductive groups are phenyl amine derivatives, particularly carbazoles and di- and tri-phenyl diamine.

Most preferably the moiety that provides the photoconductive functionality is chosen from the group of phenyl amine derivatives consisting of the following side chain structures (i) to (iii):

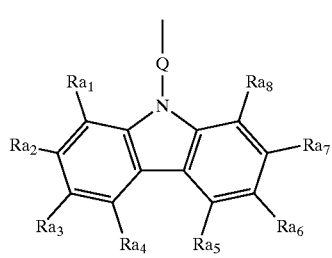

Structure (i)

wherein Q represents an alkylene group, with or without a hetero atom, such as oxygen or sulfur, and preferably Q is an alkylene group represented by $(CH_2)p$; where p is an integer of about 2 to 6; and wherein $Ra_1$, $Ra_2$, $Ra_3$, $Ra_4$, $Ra_5$, $Ra_6$, $Ra_7$, and $Ra_8$ are independently selected from the group consisting of a hydrogen atom, a linear alkyl group with up to 10 carbons, a branched alkyl group with up to 10 carbons, and an aromatic group with up to 10 carbons;

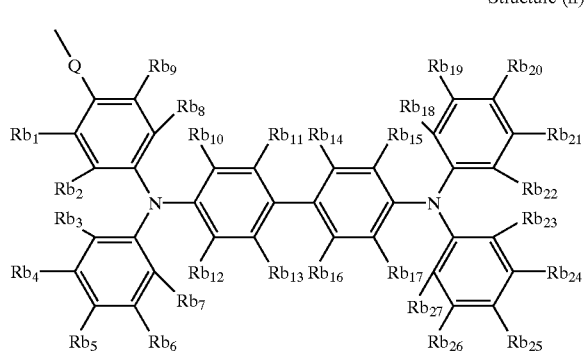

Structure (ii)

wherein Q represents an alkylene group, with or without a hetero atom, such as oxygen or sulfur, and preferably Q is an alkylene group represented by $(CH_2)p$; where p is an integer of about 2 to 6; and wherein $Rb_1$–$Rb_{27}$ are independently selected from the group consisting of a hydrogen atom, a linear alkyl group with up to 10 carbons, a branched alkyl group with up to 10 carbons, and an aromatic group with up to 10 carbons; and

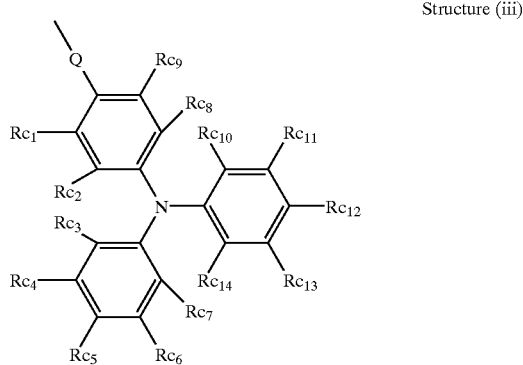

Structure (iii)

wherein Q represents an alkylene group, with or without a hetero atom, such as oxygen or sulfur, and preferably Q is an alkylene group represented by $(CH_2)p$; where p is an integer of about 2 to 6, and wherein $Rc_1$–$Rc_{14}$ are independently selected from the group consisting of a hydrogen atom, a linear alkyl group with up to 10 carbons, a branched alkyl group with up to 10 carbons, and an aromatic group with up to 10 carbons.

Likewise, the chromophore or group that provides the non-linear optical functionality may be any group known in the art to provide such capability. If this group is to be attached to the polymer matrix as a side chain, then the group, or a precursor of the group, should be capable of incorporation into a monomer that can be polymerized to form the polymer matrix of the composition.

The chromophore or group that provides the non-linear optical functionality used in the present invention is represented by formula (0):

formula (0)

wherein Q represents an alkylene group, with or without a hetero atom; such as oxygen or sulfur, and preferably Q is an alkylene group represented by $(CH_2)p$; where p is an integer of about 2 to 6; $R_1$ is selected from the group consisting of a hydrogen atom, a linear alkyl group with up to 10 carbons, a branched alkyl group with up to 10 carbons, and an aromatic group with up to 10 carbons, and preferably $R_1$ is an alkyl group which is selected from methyl, ethyl, propyl, butyl, pentyl and hexyl; G is a group having a bridge of π-conjugated bond; and Eacpt is an electron acceptor group.

In the above definition, by the term "a bridge of π-conjugated bond", it is meant a molecular fragment that connects two or more chemical groups by π-conjugated bond. A π-conjugated bond contains covalent bonds between atoms that have σ bonds and π bonds formed between two atoms by overlap of their atomic orbitals (s+p hybrid atomic orbitals for σ bonds; p atomic orbitals for π bonds).

By the term "electron acceptor", it is meant a group of atoms with a high electron affinity that can be bonded to a π-conjugated bridge. Exemplary acceptors, in order of increasing strength, are:

$C(O)NR_2 < C(O)NHR < C(O)NH_2 < C(O)OR < C(O)OH < C(O)R < C(O)H < CN < S(O)_2R < NO_2$

As typical exemplary electron acceptor groups, functional groups which is described in prior of art U.S. Pat. No. 6,267,913 and shown in the following structure figure can be used. U.S. Pat. No. 6,267,913 is hereby incorporated by reference for the purpose of describing donors and acceptors useful in this invention. The symbol "‡" in a chemical structure herein specifies an atom of attachment to another chemical group and indicates that the structure is missing a hydrogen that would normally be implied by the structure in the absence of the "‡".

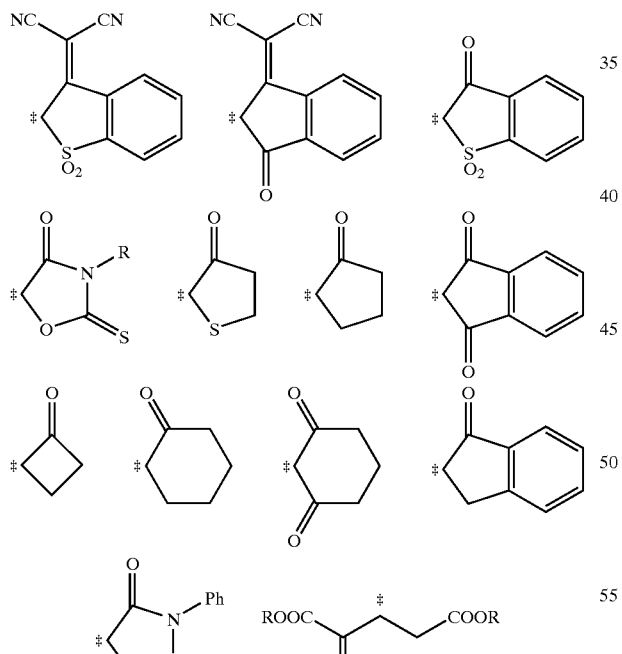

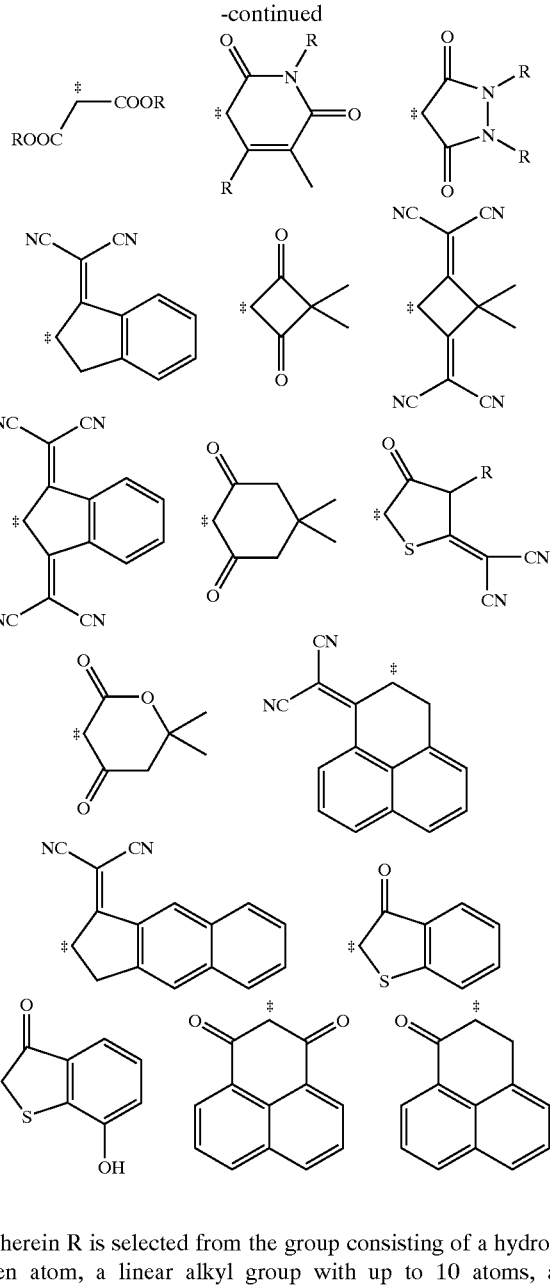

wherein R is selected from the group consisting of a hydrogen atom, a linear alkyl group with up to 10 atoms, a branched alkyl group with up to 10 atoms, and an aromatic group with up to 10 carbons.

Preferred chromophore groups are aniline-type groups or dehydronaphtyl amine groups.

Most preferably the moiety that provides the non-linear optical functionality is such a case that G in formula (0) is represented by a structure selected from the group consisting of the structures (iv), (v) and (vi);

Structure (iv)

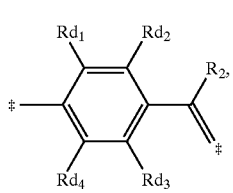

-continued

Structure (v)

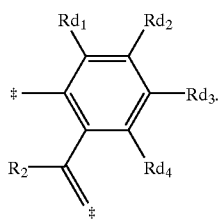

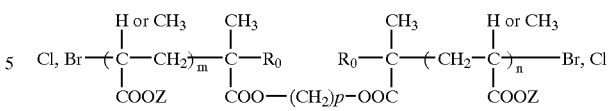
(IIa)

wherein $R_0$, R and Z are the same meaning as in formula (II); and m and n are an integer of 5 to 10,000, respectively;

wherein, in both structures (iv) and (v), $Rd_1$–$Rd_4$ are each independently selected from the group consisting of a hydrogen atom, a linear alkyl group with up to 10 atoms, a branched alkyl group with up to 10 atoms, and an aromatic group with up to 10 carbons, and preferably $Rd_1$–$Rd_4$ are all hydrogen; $R_2$ is selected from the group consisting of a hydrogen atom, a linear alkyl group with up to 10 atoms, a branched alkyl group with up to 10 atoms, and an aromatic group with up to 10 carbons;

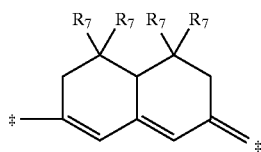
Structure (vi)

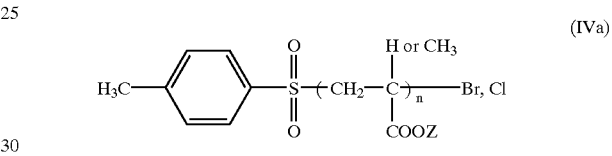
(IIIa)

wherein $R_0$ and Z are the same meaning as in formula (III); and n is an integer of 10 to 10,000;

wherein $R_7$ represents a linear or branched alkyl group with up to 10 carbons; and wherein Eacpt in formula (0) is an electron acceptor group and represented by a structure selected from the group consisting of the structures;

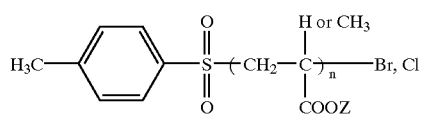
(IVa)

wherein Z is the same meaning as in formula (IV); and n is an integer of 10 to 10,000;

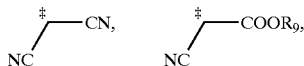 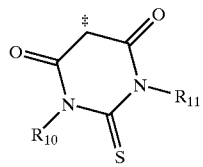

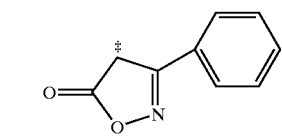 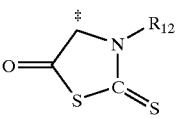

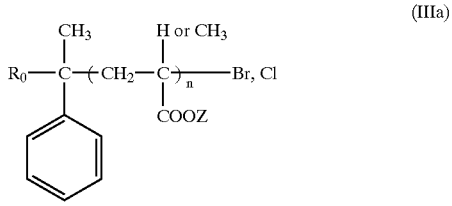
(Ib)

wherein $R_9$, $R_{10}$, $R_{11}$ and $R_{12}$ are each independently selected from the group consisting of a hydrogen atom, a linear alkyl group with up to 10 atoms, a branched alkyl group with up to 10 atoms, and an aromatic group with up to 10 carbons.

wherein $R_0$, R and Z' are the same meaning as in formula (I); and n is an integer of 10 to 10,000;

A preferred polymer used for the photorefractive composition is the following formulae (Ia), (IIa), (IIIa), (IVa), (Ib), (IIb), (IIIb), (IVb), (Ic), (IIc), (IIIc) and (IVc):

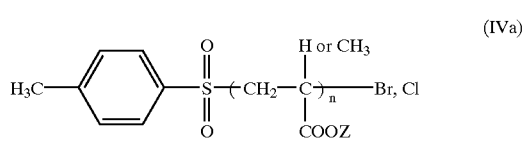
(IIb)

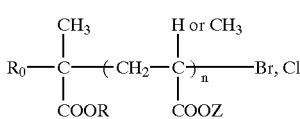
(Ia)

wherein $R_0$, R and Z' are the same meaning as in formula (II); and m and n are an integer of 5 to 10,000, respectively;

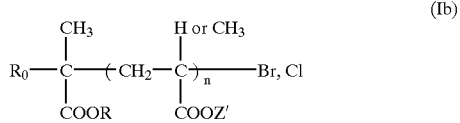
(IIIb)

wherein $R_0$, R and Z are the same meaning as in formula (I); and n is an integer of 10 to 10,000;

wherein $R_0$ and Z' are the same meaning as in formula (III); and n is an integer of 10 to 10,000;

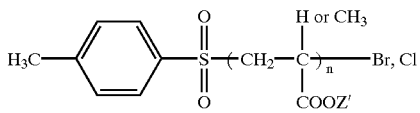

(IVb)

wherein Z' is the same meaning as in formula (IV); and n is an integer of 10 to 10,000;

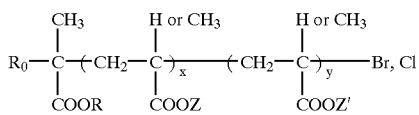

(Ic)

wherein $R_0$, R, Z and Z' are the same meaning as in formula (I); x is an integer of 5 to 10,000; and y is an integer of 5 to 10,000;

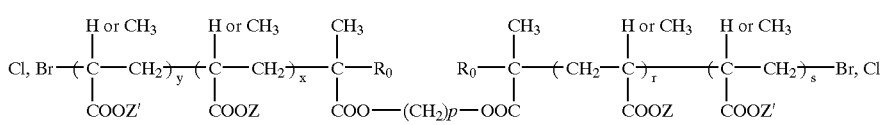

wherein $R_0$, R, Z and Z' are the same meaning as in formula (II); x is an integer of 5 to 10,000; y is an integer of 5 to 10,000; r is an integer of 5 to 10,000; and s is an integer of 5 to 10,000;

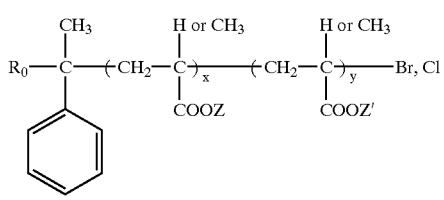

(IIIc)

wherein $R_0$, Z and Z' are the same meaning as in formula (III); and x is an integer of 5 to 10,000; and y is an integer of 5 to 10,000;

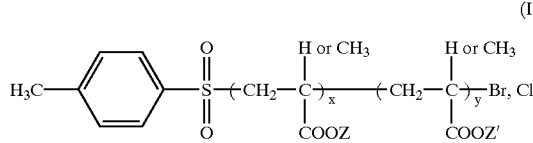

(IVc)

wherein Z and Z' are the same meaning as in formula (IV); and x is an integer of 5 to 10,000; and y is an integer of 5 to 10,000.

The polymer matrix is preferably synthesized from a monomer incorporating at least one of the above photoconductive groups or one of the above chromophore groups. The inventors have recognized that a number of physical and chemical properties are desirable in the polymer matrix. It is preferred if the polymer itself incorporates both a charge transport group and a chromophore group, so the ability of the monomer units to form copolymers is preferred. Physical properties of the formed polymer that are of importance are the molecular weight or more specifically the molecular weight distribution, as reflected in the polydispersity, and the glass transition temperature, Tg. Also, it is valuable and desirable, although not essential, that the polymer should be capable of being formed into films, coatings and shaped bodies of various kinds by standard polymer processing techniques, such as solvent coating, injection molding and extrusion.

In the present invention, the polymer generally has a weight average molecular weight, Mw, of from about 3,000 to 500,000, preferably from about 5,000 to 100,000. The term "weight average molecular weight" as used herein means the value determined by the GPC (gel permeation chromatography) method in polystyrene standards, as is well known in the art.

More significantly, the polymer preferably has a narrow polydispersity compared with typical polymers. By a narrow polydispersity, it means a polydispersity less than about 2.5, and more preferably less than about 2.0. For the present purposes, polydispersity is given by the ratio Mw/Mn (in which Mw is as defined above, and Mn is number average molecular weight, also determined by GPC in a polystyrene standard).

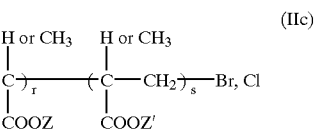

(IIc)

Polydispersity is important because of its correlation to polymer properties, such as viscosity, glass transition temperature, and other thermal and mechanical properties. Even when a polymer has the same chemical structure and components, a matrix of low polydispersity will tend to have a lower viscosity, and better thermal and mechanical handling properties, than a matrix of the same chemical structure but higher polydispersity. The low viscosity can also give rise to improved photorefractive properties.

For good photorefractive properties, the photorefractive composition should be substantially amorphous and non-crystalline under the conditions of use. Therefore, it is preferred that the finished photorefractive composition has a relatively low glass transition temperature, Tg, such as below about 50° C., more preferably below about 40° C. Preferred temperature ranges for the Tg are 10–50° C., most preferably 20–40° C. If the pure polymer itself has a glass transition temperature higher than these preferred values, which will generally be the case, components may be added to lower the Tg, as discussed in more detail below.

Nevertheless, it is preferred that the polymer itself has a relatively low glass transition temperature, by which the inventors mean a Tg no higher than about 125° C., more preferably no higher than about 120° C., and most preferably no higher than about 110° C. or 100° C.

A relatively low glass transition temperature is preferred because the greater mobility of polymer chains that polymers exhibit close to or above their glass transition temperature gives higher orientation during voltage application, and leads to better performance, such as high photoconductivity, fast response time and high diffraction efficiency, of the photorefractive device.

As mentioned in the Summary section above, a polymer composition of low polydispersity exhibits a lower glass transition temperature than the corresponding composition of higher polydispersity. For example, typical glass transition temperature for the types of (meth)acrylate polymers preferred for polymer compositions of the invention is about 90–120° C. when made by conventional polymerization techniques. When made by the low-polydispersity methods taught herein, the glass transition temperature is typically between about 80° C. and 100° C.

In principle, essentially any polymer backbone, including, but not limited to, polyurethane, epoxy polymers, polystyrene, polyether, polyester, polyamide, polyimide, polysiloxane, and polyacrylate could be used, with the appropriate side chains attached, to make the polymer matrices of the invention.

Preferred types of backbone units are those based on (meth)acrylates or styrene. Particularly preferred are methacrylate-based monomers, and most preferred are acrylate monomers. The first polymeric materials to include photoconductive functionality in the polymer itself were the polyvinyl carbazole materials developed at the University of Arizona. However, these polyvinyl carbazole polymers tend to become viscous and sticky when subjected to the heat-processing methods typically used to form the polymer into films or other shapes for use in photorefractive devices.

In contrast, preferred materials of the present invention, and particularly the (meth)acrylate-based, and more specifically methacrylate-based, polymers, have much better thermal and mechanical properties. That is, they provide better workability during processing by injection-molding or extrusion, for example. This is particularly true when the polymers are prepared by living radical polymerization, as described below, since this method yields a polymer product of lower viscosity than would be the case for the same polymer prepared by other methods.

Particular examples of monomers including a phenyl amine derivative group as the charge transport component are carbazolylpropyl (meth)acrylate monomer; 4-(N,N-diphenylamino)-phenylpropyl(meth)acrylate; N-[(meth)acroyloxypropylphenyl]-N,N',N'-triphenyl-(1,1'-biphenyl)-4,4'-diamine; N-[(meth)acroyloxypropylphenyl]-N'-phenyl-N,N'-di(3-methylphenyl)-(1,1'-biphenyl)-4,4'-diamine; and N-[(meth)acroyloxypropylphenyl]-N'-phenyl-N,N'-di(4-buthoxyphenyl)-(1,1'-biphenyl)-4,4'-diamine. Such monomers can be used singly or in mixtures of two or more monomers.

Particular examples of monomers including a chromophore group as the non-linear optical component are N-ethyl, N-4-dicyanomethylidenyl acrylate and N-ethyl, N-4-dicyanomethylidenyl-3,4,5,6,10-pentahydronaphtylpentyl acrylate.

In light of the desired features mentioned above, the inventors have recognized that the recently developed polymerization technique known as living radical polymerization has the potential for preparing polymers with unusually good photorefractive properties. In particular, living radical polymerization has the potential to form polymers with unusually low polydispersity, such as less than 2.5, preferably less than 2.0. Living radical polymerization can also be used to form random copolymers and block copolymers, as discussed in more detail below.

Diverse polymerization techniques are known in the art. One such technique is radical polymerization, which is typically carried out by using an azo-type initiator, such as AEBN (azoisobutyl nitrile).

In conventional radical polymerization, the polymer growth terminal is always in the active radical state, so it is easy for unwanted side reactions to occur, such as bimolecular coupling or disproportionation, generally making it difficult to achieve precise control of polymerization. As a result, this technique is not attractive for preparing photorefractive polymer materials.

On the other hand, as stated above, living radical polymerization is a new technique that offers the opportunity to prepare polymers with properties tailored to achieve improved photorefractive capability. Living radical polymerization differs from conventional radical polymerization in that the polymer growth terminals are temporarily protected by protection bonding. Through reversibly and radically severing this bond, it is possible to control and facilitate the growth of polymer molecules. For example, in a polymerization reaction, an initial supply of monomer can be completely consumed and growth can be temporarily suspended. However, by adding another monomer of the same or different structure, it is possible to restart polymerization. Therefore, the position of functional groups within the polymer can be controlled.

Although various polymerization techniques are known to the art and may be used in the invention, it is preferred, therefore, to prepare the polymer matrix materials of the invention by living radical polymerization, and the inventors have developed customized procedures for so doing.

Details of the living radical polymerization method are described in the literature. They may be found, for example, in the following papers:

T. Patten et al., "Radical polymerization yielding polymers with Mw/Mn ~1.05 by homogeneous atom transfer radical polymerization", *Polymer Preprints*, 1996, 37, 575.

K. Matyjasewski et al., "Controlled/living radical polymerization. Halogen atom transfer radical polymerization promoted by a Cu(I)/Cu(II) redox process", *Macromolecules*, 1995, 28, 7901.

M. Sawamoto et al., "Ruthenium-mediated living radical polymerization of methyl methacrylate", *Macromolecules*, 1996, 29, 1070.

Living radical polymerization is also described at length in U.S. Pat. No. 5,807,937 to Carnegie-Mellon University, which is incorporated herein by reference in its entirety.

Briefly, living radical polymerization technique of the invention involves the use of a polymerization initiator, transition metal catalyst and a ligand (an activating agent) capable of reversibly forming a complex with the transition metal catalyst.

The polymerization initiator is typically a halogen-containing organic compounds. After polymerization, this initiator or components of the initiator are attached to the polymer at both polymer terminals. The polymerization initiator preferably used is an ester-based or styrene-based derivative containing a halogen in the α-position.

The polymerization initiator is preferably shown by the following formula (I"), (II") or (III").

formula (I")

wherein $R_0$ represents a hydrogen atom or alkyl group with up to 10 carbons; and R is selected from the group consisting of a hydrogen atom, a linear alkyl group with up to 10 carbons, a branched alkyl group with up to 10 carbons, and an aromatic group with up to 10 carbons;

formula (II″)

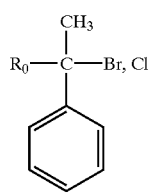

wherein $R_0$ represents a hydrogen atom or alkyl group with up to 10 carbons.

formula (III″)

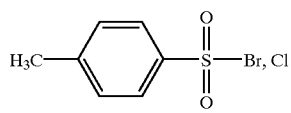

Particularly preferred are 2-bromo(or chloro) methylpropionic acid, or bromo-(or chloro)-1-phenyl derivatives. Specific examples of these derivatives include ethyl 2-bromo(or chloro)-2-methylpropionate, ethyl 2-bromo(or chloro) propionate, 2-hydroxyethyl 2-bromo(or chloro)-2-methylpropionate, 2-hydroxyethyl 2-bromo(or chloro)-2-propionate, and 1-phenyl ethyl bromide(chloride).

Instead of a mono bromo(chloro) type initiator, a di-bromo(chloro) type initiator, such as dibromo(chloro) ester derivative, can be used. Such initiators are represented by the formula (IV″):

formula (IV″)

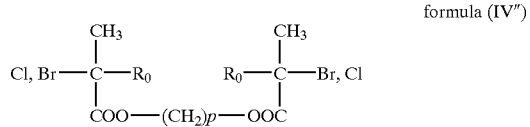

wherein $R_0$ represents independently a hydrogen atom or alkyl group with up to 10 carbons; and p is 2 to 6.

Of these initiators, most preferred is ethylene bis(2-bromo (chloro)-2-methylpropionate). By using this initiator, the inventors have discovered that block copolymers, and particularly A—B—A type or B—A—B type block copolymers, can be produced very efficiently.

In the process of the invention, the polymerization initiator is generally used in an amount of from 0.01 to 20 mol %, preferably from 0.1 to 10 mol %, and more preferably from 0.2 to 5 mol %, per mole of the sum of the polymerizable monomers.

Various types of catalysts are known, including perfluoroalkyl iodide type, TEMPO (phenylethoxytetramethylpiperidine) type, and transition metal type. The inventors have discovered that high-quality polymers can be made by using transition-metal catalysts, which are safer, simpler, and more amenable to industrial-scale operation than TEMPO-type catalysts. Therefore, in the process of the invention a transition-metal catalyst is preferred.

Non-limiting examples of transition metals that may be used include Cu, Ru, Fe, Rh, V, and Ni. Particularly preferred is Cu. Typically, but not necessarily, the transition metal is used in the form of the metal halide (chloride, bromide, etc.).

The transition metal in the form of a halide or the like is generally used in the amount of from 0.01 to 3 moles, and preferably from 0.1 to 1 mole, per mole of polymerization initiator.

The activating agent (ligand) is an organic ligand of the type known in the art that can be reversibly coordinated with the transition metal as a center to form a complex. The ligand preferably used is a bipyridine derivative, mercaptans derivative, trifluorate derivative, or the like. When complexed with the activating ligand, the transition metal catalyst is rendered soluble in the polymerization solvent. In other words, the activating agent serves as a co-catalyst to activate the catalyst, and start the polymerization.

The ligand is used in an amount of normally from 1 to 5 moles, and preferably from 2 to 3 moles, per mole of transition metal halide.

The use of the polymerization initiator and the activating agent in the above recommended proportions makes it possible to provide good results in terms of the reactivity of the living radical polymerization and the molecular weight and weight distribution of the resulting polymer.

In the present invention, living radical polymerization can be carried out without a solvent or in the presence of a solvent, such as butyl acetate, toluene or xylene.

To initiate the polymerization process, the monomer(s), polymerization initiator, transition metal catalyst, activating agent and solvent are introduced into the reaction vessel. As the process starts, the catalyst and initiator form a radical, which attacks the monomer and starts the polymerization growth.

The living radical polymerization is preferably carried out at a temperature of from about 70° C. to 130° C., and is allowed to continue for about 1 to 100 hours, depending on the desired final molecular weight and polymerization temperature, and taking into account the polymerization rate and deactivation of catalyst.

To perform the polymerization without using a solvent, the reaction is carried out in a similar manner, above the melting point of the monomer. For example, the melting point of a TPD monomer may be 125° C., in which case the polymerization may be carried out at 130° C.

By carrying out the living radical polymerization technique based on the teachings and preferences given above, it is possible to prepare homopolymers carrying charge transport or non-linear optical groups, as well as random or block copolymers carrying both charge transport and non-linear optical groups. Further, by following the techniques described herein, it is possible to prepare such materials with exceptionally good properties, such as polydispersity, photoconductivity, response time and diffraction efficiency.

If the polymer is made from monomers that provide only charge transport ability, the photorefractive composition of the invention can be made by dispersing a component that possesses non-linear optical properties through the polymer matrix, as is described in U.S. Pat. No. 5,064,264 to IBM, which is incorporated herein by reference. Suitable materials are known in the art and are well described in the literature, such as in D. S. Chemla & J. Zyss, "Nonlinear Optical Properties of Organic Molecules and Crystals" (Academic Press, 1987). Also, as described in U.S. Pat. No. 6,090,332 to Seth R. Marder et. al., fused ring bridge, ring locked chromophores that form thermally stable photorefractive compositions can be used. For typical, non-limiting examples of chromophore additives, the following chemical structure compounds can be used:

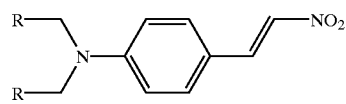

-continued

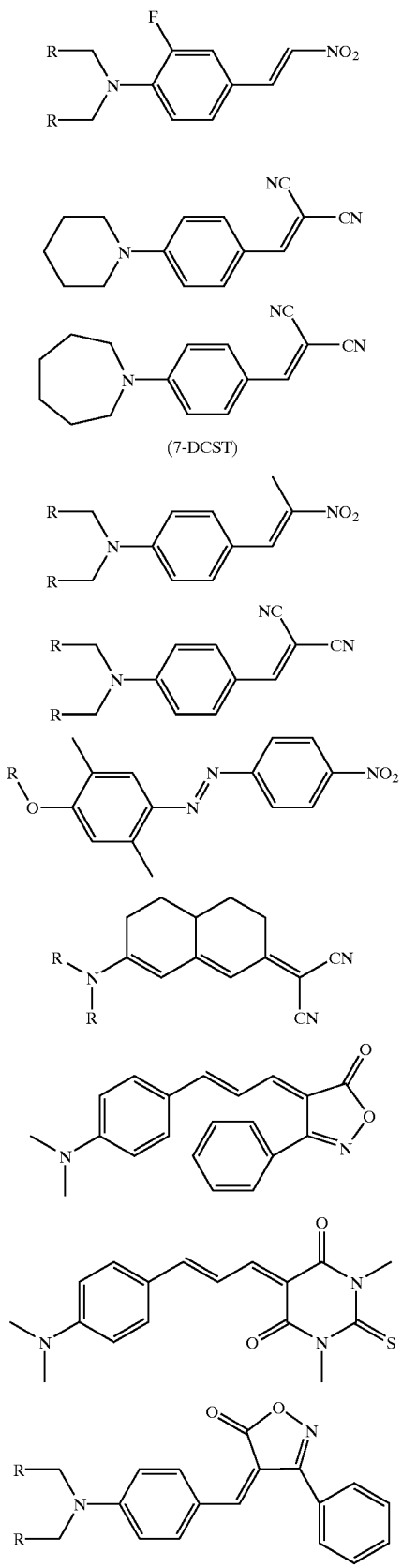

(7-DCST)

-continued

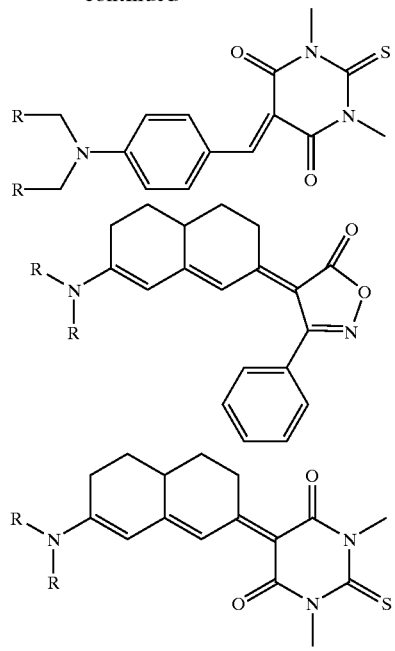

The chosen compound(s) is usually mixed in the matrix charge transport homopolymer in a concentration of about 1–80 wt %, more preferably 5–50 wt %.

On the other hand, if the polymer is made from monomers that provide only non-linear optical ability, the photorefractive composition of the invention can be made by mixing a component that possesses charge transport properties into the polymer matrix, again as is described in U.S. Pat. No. 5,064,264 to IBM. Preferred charge transport compounds are good hole transfer compounds, for example N-alkyl carbazole or triphenylamine derivatives.

As an alternative, or in addition, to adding the charge transport component in the form of a dispersion of entities comprising individual molecules with charge transport capability, a polymer blend can be made of individual polymers with charge transport and non-linear optical abilities. For the charge transport polymer, the polymers already described above, such as containing phenyl-amine derivative side chains, can be used. Since polymers containing only charge transport groups are comparatively easy to prepare by conventional techniques, the charge transport polymer may be made by living radical polymerization or by any other convenient method.

To prepare the non-linear optical polymer itself, monomers that have side-chain groups possessing non-linear-optical ability should be used. Non-limiting examples of monomers that may be used are those containing the following chemical structures:

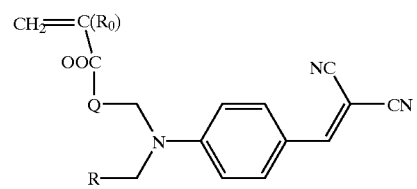

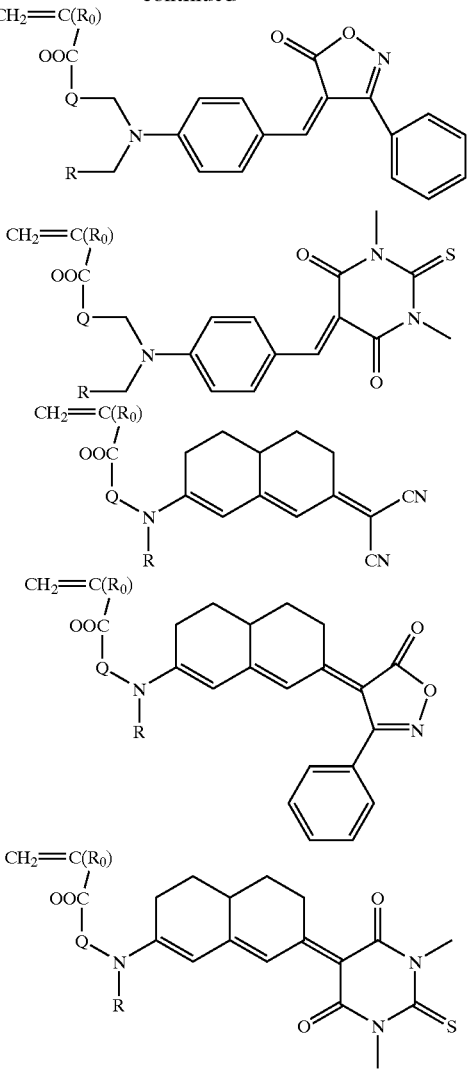

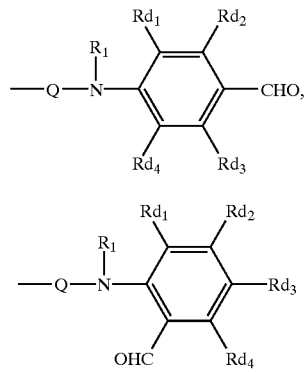

wherein, in both structures 1 and 2, Q represents an alkylene group, with or without a hetero atom, such as oxygen or sulfur, and preferably Q is an alkylene group represented by $(CH_2)p$; where p is of about 2 to 6; and wherein $Rd_1$–$Rd_4$ are independently selected from the group consisting of a hydrogen atom, a linear alkyl group with up to 10 carbons, a branched alkyl group with up to 10 atoms, and an aromatic group with up to 10 carbons, and preferably $Rd_1$–$Rd_4$ are hydrogen; and wherein $R_1$ represents a linear or branched alkyl group with up to 10 carbons, and preferably $R_1$ is an alkyl group selected from methyl, ethyl, propyl, butyl, pentyl and hexyls; and

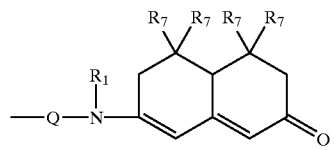

wherein Q represents an alkylene group, with or without a hetero atom, such as oxygen or sulfur, and preferably Q is an alkylene group represented by $(CH_2)p$; where p is of about 2 to 6; and wherein $R_1$ represents a linear or branched alkyl group with up to 10 carbons, and preferably $R_1$ is an alkyl group selected from methyl, ethyl, propyl, butyl, pentyl and hexyls; and wherein $R_7$ represents a linear or branched alkyl group with up to 10 carbons.

wherein Q represents an alkylene group with or without a hetero atom, such as oxygen or sulfur, and preferably Q is an alkylene group represented by $(CH_2)p$; where p is of about 2 to 6; $R_0$ is a hydrogen atom or methyl group, and R is a linear or branched alkyl group with up to 10 carbons; and preferably R is an alkyl group which is selected from methyl, ethyl, and propyl.

The inventors have discovered a new technique for preparing such polymers. The technique involves the use of a precursor monomer containing a precursor functional group for non-linear optical ability. Typically, this precursor is represented by the general formula:

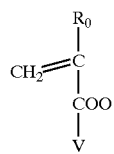

wherein $R_0$ is a hydrogen atom or methyl group, and V is selected from the group consisting of the following structures 1 to 3:

The procedure for performing the living radical polymerization in this case involves the use of the same polymerization initiators, transition metal catalysts, activating agents, and solvents, and the same operating conditions and preferences as have already been described above.

After the precursor polymer has been formed, it can be converted into the corresponding polymer having non-linear optical groups and capabilities by a condensation reaction. Typically, the condensation reagent may be selected from the group consisting of

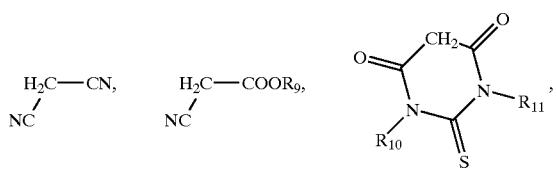

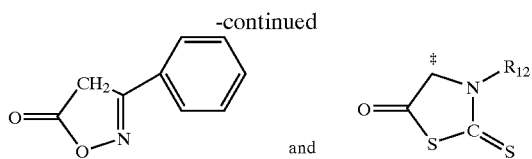

and wherein $R_9$, $R_{10}$, $R_{11}$, and $R_{12}$ are independently selected from the group consisting of a hydrogen atom, a linear alkyl group with up to 10 carbons, a branched alkyl group with up to 10 carbons, and an aromatic group with up to 10 carbons.

The condensation reaction can be done at room temperature for 1–100 hrs, in the presence of a pyridine derivative catalyst. A solvent, such as butyl acetate, chloroform, dichloromethylene, toluene or xylene can be used. Optionally, the reaction may be carried out without the catalyst at a solvent reflux temperature of 30° C. or above for about 1 to 100 hours.

The inventors have discovered that use of a monomer containing a precursor group for non-linear-optical ability, and conversion of that group after polymerization tends to result in a polymer product of lower polydispersity than the case if a monomer containing the non-linear-optical group is used. This is, therefore, preferred technique by the invention.

To prepare copolymers, both the non-linear-optical monomer and the charge transport monomer, each of which can be selected from the types mentioned above, should be used.

There are no restrictions on the ratio of monomer units. However, as a typical representative example, the ratio of [a (meth)acrylic monomer having charge transport ability]/[a (meth)acrylate monomer having non-linear optical ability] is between about 4/1 and 1/4 by weight. More preferably, the ratio is between about 2/1 and 1/2 by weight. If this ratio is less than about 1/4, the charge transport ability is weak, and the response time tends to be too slow to give good photorefractivity. On the other hand, if this ratio is more than about 4/1, the non-linear-optical ability is weak, and the diffraction efficiency tends to be too low to give good photorefractivity.

In the living radical polymerization method of the invention, the monomer addition sequence is important for achieving the desired copolymer structure. For example, to make random copolymers, both the chromophore-containing and the charge-transport-group-containing monomers can be added at the same time.

However, by adding the monomers sequentially, block type copolymers can be prepared. For example, to prepare an A—B type block copolymer, wherein polymer block A has charge transport ability and polymer block B has non-linear-optical ability, firstly the monomer having charge transport ability is polymerized, preferably by using a mono bromo(chloro) type initiator. Subsequently, the second monomer having non-linear-optical ability is added to continue the polymerization. In this way, an A—B type block copolymer can be produced. During this polymerization procedure, the second monomer is added at the time when the first monomer is polymerized more than 50% by weight, normally 70% by weight or more, preferably 80% by weight or more, and more preferably 90% by weight or more.

On the other hand, if the monomer having non-linear-optical ability is polymerized first, a B—A type block copolymer can be produced. Similarly to the above polymerization procedure, the second monomer is added at the time when the first monomer is polymerized more than 50% by weight, normally 70% by weight or more, preferably 80% by weight or more, and more preferably 90% by weight or more.

Further, if living radical polymerization is carried out in a manner such that, first, the monomer having charge transport ability is polymerized, then the second monomer having non-linear-optical ability is added to continue polymerization, and thirdly an additional amount of the monomer having charge transport ability is added to continue polymerization, an A—B—A type block copolymer can be produced. During the successive polymerization procedure, the monomer to be subsequently added is added at the time when the conversion of the monomer which has been previously added exceeds at least 50% by weight, normally 60% by weight or more, preferably 80% by weight or more, and more preferably 90% by weight or more.

Moreover, if the above three-stage polymerization is followed by the addition of the another monomer to continue the polymerization of monomers, an A—B—A—B type block copolymer can be produced. From the above explanation, it will be apparent to those of skill in the art that the new methods that the inventors have developed can be used, by changing the sequence of monomer addition, to produce block copolymers of any desired type, including, but not limited to B—A—B, B—A—B—A, B—A—B—A—B—A, or A—B—A—B—A type block copolymers.

If the copolymer constitutes two or more of polymer blocks A, the A-type constituting blocks need not necessarily be prepared from the same monomer. Likewise, if the copolymer constitutes two or more of polymer blocks B, the B-type blocks need not necessarily be prepared from the same monomer. Thus, the individual blocks may be of different forms represented by A1, A2, A3, etc. and B1, B2, B3 etc. In this way, a large diversity of polymers, such as A1—B—A2, B1—B2—A, or A1—B1—A2—B2 can be produced.

Optionally, other components may be added to the polymer matrix to provide or improve the desired physical properties mentioned earlier in this section. Usually, for good photorefractive capability, it is preferred to add a photosensitizer to serve as a charge generator. A wide choice of such photosensitizers is known in the art. Typical, but non-limiting examples of photosensitizers that may be used are 2,4,7-trinitro-9-fluorenone (TNF) and C60. The amount of photosensitizer required is usually less than 3 wt %.

As mentioned above, it is preferred that the polymer matrix have a relatively low glass-transition temperature, and be workable by conventional processing techniques. Optionally, a plasticizer may be added to the composition to reduce the glass transition temperature and/or facilitate workability. The type of plasticizer suitable for use in the invention is not restricted; many such materials will be familiar to those of skill in the art. Representative typical examples include N-alkylcarbazole and dioctylphthalate. Oligomer-type compounds of the charge transport or non-linear-optical monomers may also be used to control the Tg of the composition.

In general, the smallest amount of plasticizer required to provide a suitable overall Tg for the composition should be used. Compositions with large amounts of plasticizer tend to have lower stability, as the polymer matrix and the plasticizer may phase separate over time. Also, the photorefractive properties of the material are diminished by dilution of the active components by the plasticizer.

As discussed above, the invention provides polymers of comparatively low Tg when compared with similar polymers prepared in accordance with prior art methods. The inventors have recognized that this provides a benefit in terms of lower dependence on plasticizers. By selecting polymers of intrinsically moderate Tg and by using methods that tend to depress the average Tg, it is possible to limit the amount of plasticizer required for the composition to preferably no more than about 30% or 25%, and more preferably lower, such as no more than about 20%.

Yet another method to adjust the Tg or improve film formation ability, for example, is to add another monomer, such as an acrylic or methacrylic acid alkyl ester, as a modifying co-monomer. Examples of modifying co-monomers are $CH_2=CR_0$—COOR wherein $R_0$ represents a hydrogen atom or methyl group, and R represents a $C_{2-14}$ alkyl group, such as butylacrylate, ethyl acrylate, propyl acrylate, 2-ethylhexyl (meth)acrylate and hexyl (meth)acrylate.

The photorefractive materials of the invention provide combinations of desirable properties not previously available to the art.

One particularly advantageous feature is the high photoconductivity. In the context of the invention, by photoconductivity the inventors mean the increase in conductivity of the photorefractive material under laser irradiation. The photoconductivity of a sample of material may be measured by the following method. First, the steady-state conductivity properties are measured in the dark, by applying an electric field across the sample, allowing the system to come to steady state, and measuring the resulting current. Then the measurements are repeated while illuminating the sample with a pulse from a single laser beam. The photoconductivity, $\Phi_{photo}$, can then be calculated using the following relation:

$$\Phi_{photo} = (i_{photo} - i_{dark})/A_{beam} E_a$$

where:
  $E_a$ is the applied electric field,
  $A_{beam}$ is the illuminated area,
  $i_{photo}$ is electric current with laser irradiation, and
  $i_{dark}$ is electric current without irradiation Photoconductivity is important because it is a measure of how efficiently charge transport can take place in the material. If all other parameters are fixed, the higher the photoconductivity, the faster is the device response time.

Typical photoconductivities for organic materials and polymers are in the range from about 0.01 pS/cm to a maximum of no higher than 1,000 pS/cm. In fact, the value for conventional photorefractive polymers is usually less than 10 pS/cm, as described in several papers, for example in M. A. Diaz-Garcia et al. (*Chem. Mater.*, 1999, 11, 1784). However, surprisingly, the polymers of the invention generally have photoconductivity of more than 100 pS/cm, which is at least an order of magnitude better than currently used materials, and preferably exhibit a photoconductivity of more than 200 pS/cm.

A very few materials have been reported with photoconductivity higher than 10 pS/cm, and even fewer with photoconductivity higher than 100 pS/cm. To the inventors' knowledge, the highest photoconductivity ever reported is 2,800 pS/cm (N. Peyghambarian et al., *J. Mater. Chem.*, 1999, 9, 2251), in a PVK-type material.

Yet, for materials of the invention the inventors have measured photoconductivity of 3,000 pS/cm or above, specifically 3,500 pS/cm.

Furthermore, the inventors are aware of no photorefractive composition that provide a photoconductivity of at least 10 pS/cm and, at the same time, offers any one of the other advantageous properties provided herein, such as a polydispersity of no more than about 2.5 or 2.0, a response time of no more than about 50 ms, a diffraction efficiency of at least about 5%, the good mechanical properties and easy processability of an acrylate-based polymer, the presence of both charge transport and non-linear optical groups as side chains in the polymer, especially in the form of block copolymers, or the efficiency and flexibility of preparation of the living radical polymerization technique.

Another particularly advantageous feature is the fast response time. Response time is the time for building up of the diffraction grating in the photorefractive material when exposed to a laser writing beam. The response time of a sample of material may be measured by transient four-wave mixing (TFWM) experiments, as detailed in the Examples section below. The data may then be fitted with the following bi-exponential function:

$$\eta(t) = \eta_0 (1 - a_1 e^{-t/J_1} - a_2 e^{-t/J_2})^2$$

with $a_1 + a_2 = 1$
where $\eta(t)$ is the diffraction efficiency at time t, $\eta_0$ is the steady-state diffraction efficiency, and $J_1$ and $J_2$ are the grating build-up times. Between $J_1$ and $J_2$, the smaller number is defined as the response time.

Response time is important because the faster response time means faster grating build-up, which enables the photorefractive composition to be used for wider applications, such as real-time hologram applications.

Typical response times for known photorefractive materials range from seconds to sub-seconds. Times longer than 100 ms are common. Faster response times have been reported, see W. F. Moerner, Appl. Phys. Lett., Vol. 73, p. 1490 (1998), but, in order to get these higher speeds, higher field strengths have been required. Such higher field strengths may be difficult in an industrial, rather than a laboratory, environment. Also, the polyvinyl carbazole polymers used to obtain higher speeds become sticky and difficult to handle during heat processing. In contrast, the methacrylate-based, or more specifically acrylate-based polymers, that are preferred herein provide excellent workability during heat processing and other polymer handling methods.

In comparison with typical prior art materials, the photorefractive compositions of the invention provide good response times, such as no more than about 50 ms, and preferably faster, such as no more than about 40 ms, no more than about 35 ms, or no more than about 30 ms.

Furthermore, these response times can be achieved without resorting to a very high electric field, expressed as biased voltage. By a very high biased voltage, inventors mean a field in excess of about 100 V/$\mu$m. In inventors' materials, fast response times can generally be achieved at biased voltages no higher than about 100 V/$\mu$m, more preferably no higher than about 90 V/$\mu$m.

And, as discussed with respect to photoconductivity, these good response times can be provided in conjunction with one or more of the other advantageous properties as they are characterized above, such as high photoconductivity, low polydispersity, high diffraction efficiency, good processing capabilities, block copolymer capability, and efficient polymerization techniques.

Yet another advantageous feature is the diffraction efficiency. Diffraction efficiency is defined as the ratio of the intensity of the diffracted beam to the intensity of the incident probe beam, and is determined by measuring the intensities of the respective beams. Obviously, the closer to 100% is the ratio, the more efficient is the device.

In general, for a given photorefractive composition, a higher diffraction efficiency can be achieved by increasing the applied bias voltage.

In comparison with typical prior art materials, the photorefractive compositions of the invention provide good diffraction efficiencies. And, as discussed with respect to photoconductivity, these good diffraction efficiencies can be provided in conjunction with one or more of the other advantageous properties as they are characterized above, such as high photoconductivity, low polydispersity, or fast response time, and in conjunction with good processing capabilities, block copolymer capability, and efficient polymerization techniques.

The invention is now further described by the following examples, which are intended to be illustrative of the invention, but are not intended to limit the scope or underlying principles in any way.

EXAMPLES

Production Example 1

(a) Monomers Containing Charge Transport Groups

Two types of charge transport monomers were purchased from Fuji Chemical, Japan:

(i) a carbazole-type monomer (3-carbazolylpropyl acrylate), and (ii) a triphenyl diamine type (N-[acroyloxypropylphenyl]-N,N',N'-triphenyl-(1,1'-biphenyl)-4,4'-diamine)(TPD acrylate). The TPD acrylate type monomer had the structure:

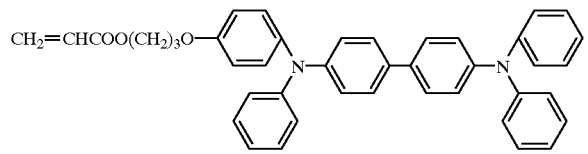

These monomers were custom-prepared for us by using the scheme below in which standard abbreviations for reagents and catalysts are used.

(i) Carbazole-type monomer:

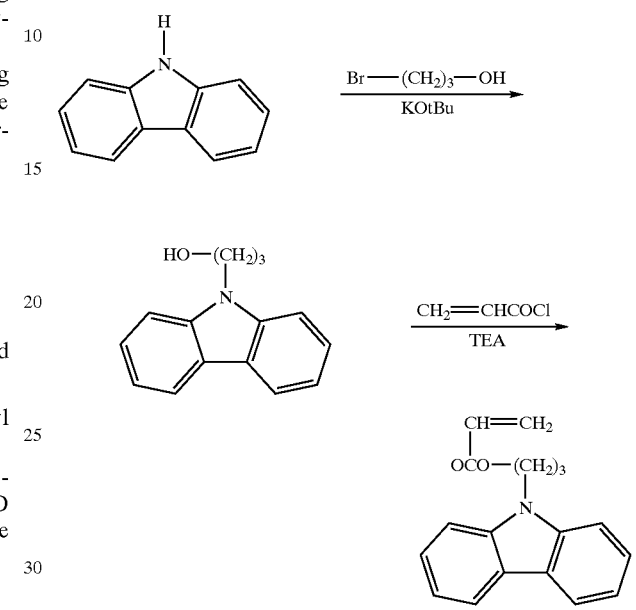

(ii) TPD-type monomer:

TPD acrylate monomer was prepared by the following procedure.

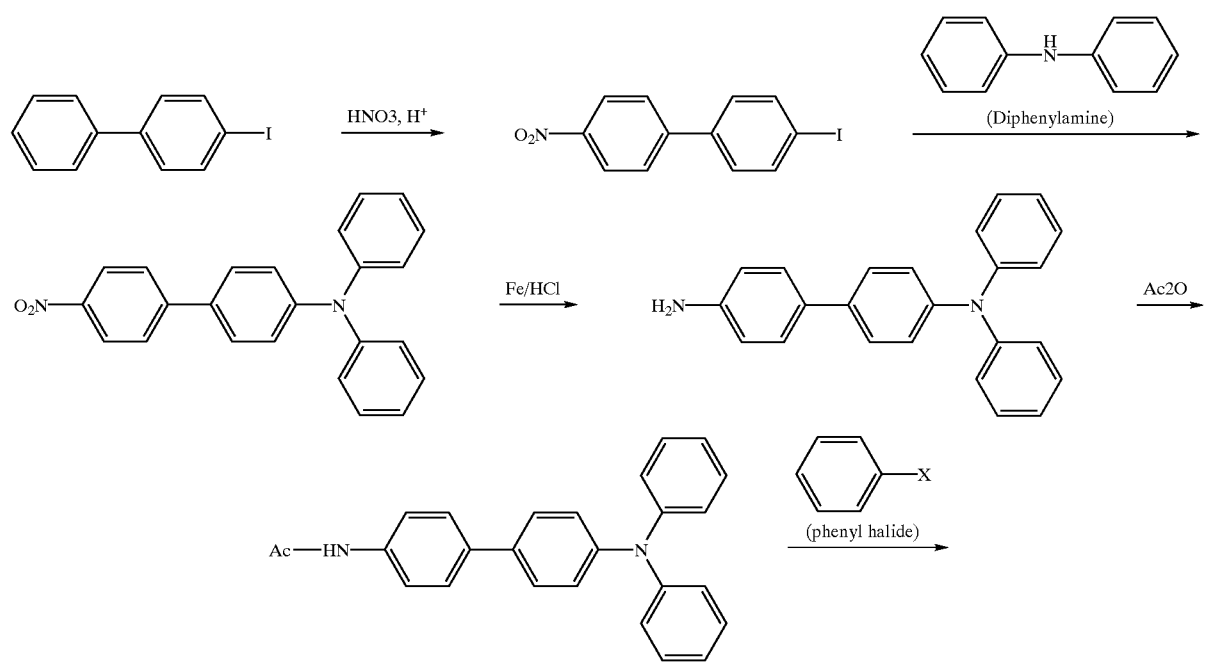

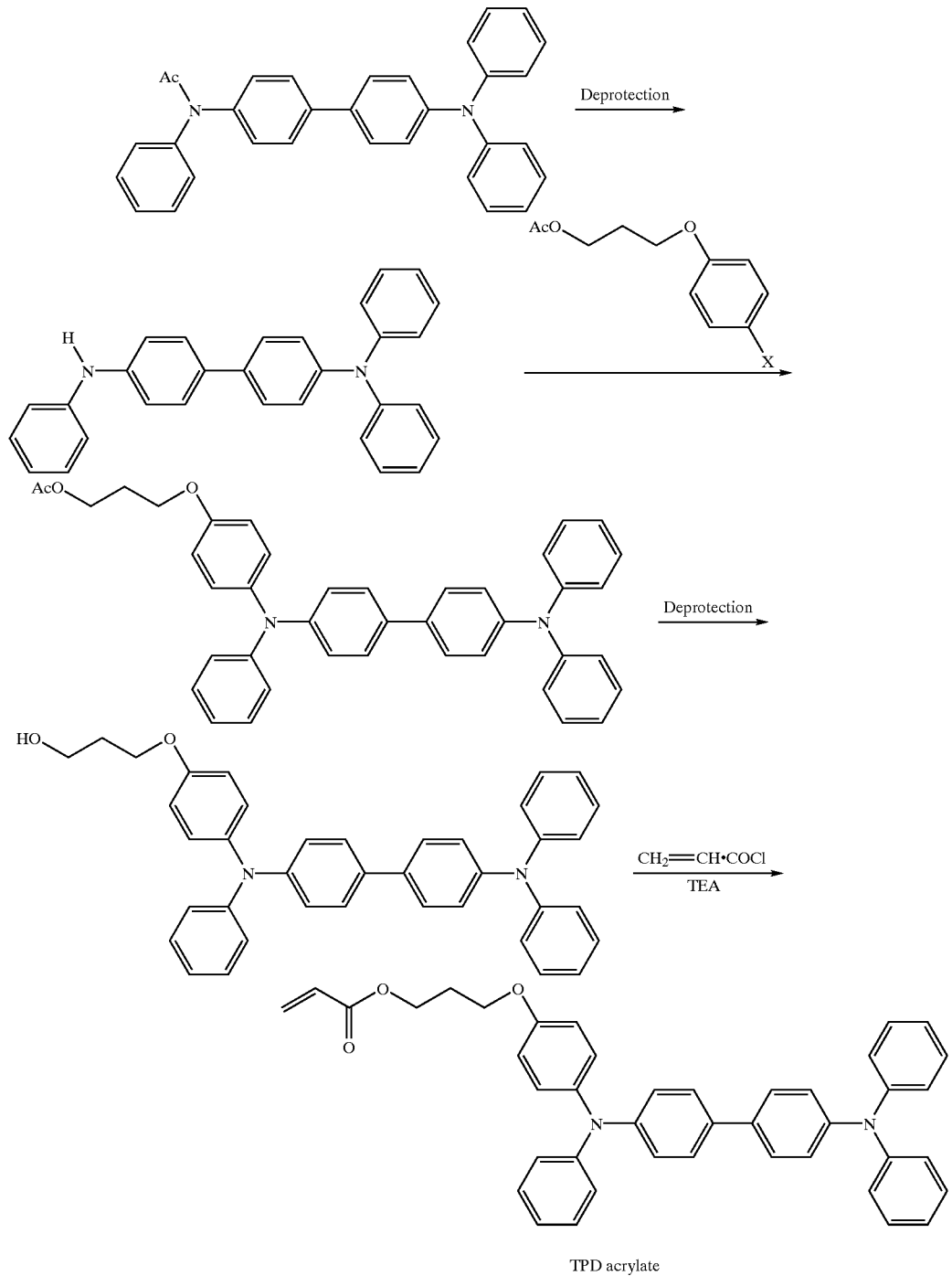

TPD acrylate

In the above procedure, usage of 3-methyl diphenylamine instead of diphenylamine and 3-methylphenyl halide instead of phenyl halide can result in the formation of N(acroyloxypropylphenyl)-N'-phenyl-N,N'-di(3-methylphenyl)-(1,1'-biphenyl)-4,4'-diamine.

(b) Monomers Containing Non-linear-optical Groups

The non-linear-optical precursor monomer 5-[N-ethyl-N-4-formylphenyl]amino-pentyl acrylate was synthesized according to the following synthesis scheme:

STEP I:

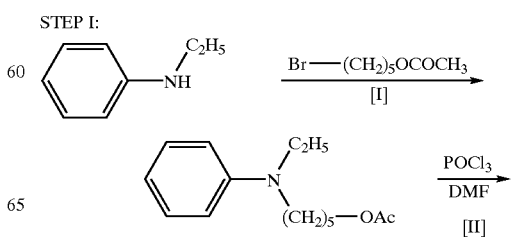

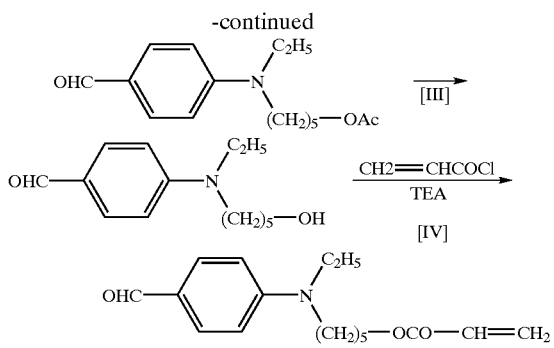

Into bromopentyl acetate (5 mL, 30 mmol) and toluene (25 mL), triethylamine (4.2 mL, 30 mmol) and N-ethylaniline (4 mL, 30 mmol) were added at room temperature. This solution was heated at 120° C. overnight. After cooling down, the reaction mixture was rotary-evaporated. The residue was purified by silica gel chromatography (developing solvent: hexane/acetone=9/1). An oily amine compound was obtained. (Yield: 6.0 g (80%)).

Step II:

Anhydrous DMF (6 mL, 77.5 mmol) was cooled in an ice-bath. Then, $POCl_3$ (2.3 mL, 24.5 mmol) was added dropwise into the 25 mL flask, and the mixture was allowed to come to room temperature. The amine compound (5.8 g, 23.3 mmol) was added through a rubber septum by syringe with dichloroethane. After stirring for 30 min., this reaction mixture was heated to 90° C. and the reaction was allowed to proceed for overnight under an argon atmosphere.

On the next day, the reaction mixture was cooled, and poured into and extracted by ether. The ether layer was washed with potassium carbonate solution and dried over anhydrous magnesium sulfate. After removing the magnesium sulfate, the solvent was removed and the residue was purified by silica gel chromatography (developing solvent: hexane/ethyl acetate=3/1). An aldehyde compound was obtained. (Yield: 4.2 g (65%)).

Step III:

The aldehyde compound (3.92 g, 14.1 mmol) was dissolved with methanol (20 mL). Into this, potassium carbonate (400 mg) and water (1 mL) were added at room temperature and the solution was stirred overnight. On the next day, the solution was poured into brine water and extracted by ether. The ether layer was dried over anhydrous magnesium sulfate. After removing the magnesium sulfate, the solvent was removed and the residue was purified by silica gel chromatography (developing solvent: hexane/acetone= 1/1). An aldehyde alcohol compound was obtained. (Yield: 3.2 g (96%)).

Step IV:

The aldehyde alcohol (5.8 g, 24.7 mmol) was dissolved with anhydrous THF (60 mL). Into this, triethylamine (3.8 mL, 27.1 mmol) was added and the solution was cooled by ice-bath. Acrolyl chloride (2.1 mL, 26.5 mmol) was added and the solution was maintained at 0° C. for 20 minutes. Thereafter, the solution was allowed to warm up to room temperature and stirred at room temperature for 1 hour, at which point TLC indicated that all of the alcohol compound had disappeared. The solution was poured into brine water and extracted by ether. The ether layer was dried over anhydrous magnesium sulfate. After removing the magnesium sulfate, the solvent was removed and the residue acrylate compound was purified by silica gel chromatography (developing solvent: hexane/acetone=1/1). The compound yield was 5.38 g (76%), and the compound purity was 99% (by GC).

(c) Polymerization Initiator Ethylene bis(2-Bromo(chloro)-2-methylpropionate)(Br-BMP)

The polymerization initiator ethylene bis(2-bromo (chloro)-2-methylpropionate) (Br-BMP) was synthesized in the following manner. First, anhydrous ethylene glycol (5 g, 81 mmol), triethylamine (17.2 g, 170 mmol), pyridine (1 mL, 12 mmol), and THF (50 mL) were charged into a reaction vessel. To the mixture, 2-bromopropionic acid bromide (42.0 g, 171 mmol) was added, and the reaction vessel was cooled over an ice bath to suppress an exothermic reaction.

The reaction was allowed to run to completion overnight, and the resulting precipitate was removed by filtration. To the filtrate, ethyl acetate (200 mL) and saturated brine (150 mL) were added. The mixture was then allowed to stand for a few minutes. The resulting upper ethyl acetate layer was washed twice with diluted hydrochloric acid and then three times with saturated brine (150 mL), and then dried with anhydrous magnesium sulfate. Magnesium sulfate was removed, and the ethyl acetate was then distilled off under reduced pressure to obtain a crude product.

The crude product thus obtained was purified by silica gel chromatography (developing solvent: 1/1 mixture of ethyl acetate and hexane) to obtain Br-BMP as the desired product. The yield of Br-BMP was 24.2 g (83% by weight).

d) Synthesis of Non-linear-optical Chromophore 7-DCST

The non-linear-optical precursor 7-DCST (7 member ring dicyanostyrene, 4-homopiperidinobenzylidene malononitrile) was synthesized according to the following two-step synthesis scheme:

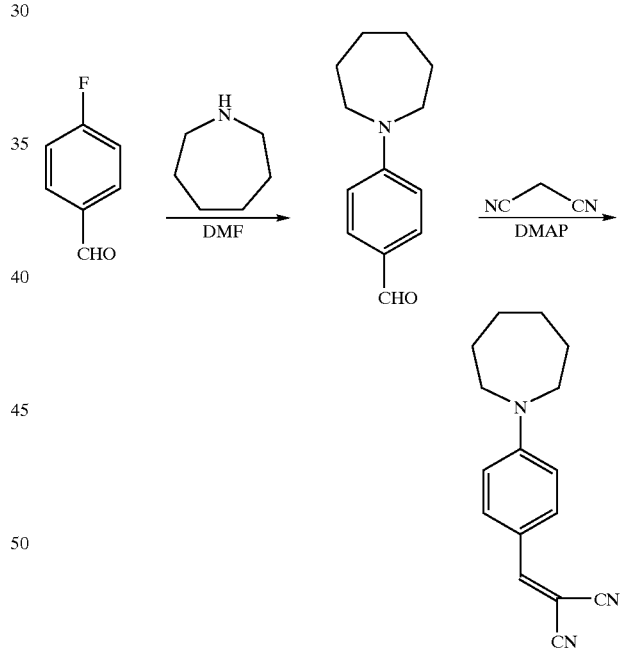

A mixture of 4-fluorobenzaldehyde (17.8 g, 143 mmol), homopiperidine (15.0 g, 151 mmol), lithium carbonate (55 g, 744 mmol), and DMF (100 mL) was stirred at 50° C. for 16 hr. Water (500 mL) was added to the reaction mixture. The products were extracted with ether (1 L). After removal of ether, the crude products were purified by silica gel column chromatography using hexanes-ethyl acetate (9:1) as eluent. 4-(Dimethylamino)pyridine (100 mg, 0.82 mmol) was added to a solution of the 4-homopiperidinobenzaldehyde (18.2 g, 89.5 mmol) and malononitrile (9.1 g, 137.8 mmol) in methanol (60 mL). The reaction mixture was kept at room temperature and the product was collected by filtration and purified by recrystallization from dichloromethane. Yield (17.1 g, 48%).

e) Other Materials

Beside the above monomers and initiator, other chemicals, such as copper bromide, bipyridine and ethyl 2-bromo-2-methylpropionate, were purchased from Aldrich Chemicals, Milwaukee, Wis.

Production Example 2
Preparation of Charge Transport Homopolymer (TPD Acrylate Type)

N-[(meth)acroyloxypropylphenyl]-N,N',N'-triphenyl-(1, 1'-biphenyl)-4,4'-diamine (TPD acrylate) (6.2 g, 10 mmol), bipyridine (156 mg, 1.0 mmol; as a ligand), and butyl acetate (6 mL) were put into a three-necked flask. After purging by argon gas for 1 hour, ethyl 2-bromo-2-methylpropionate (78 mg, 0.40 mmol; as a polymerization initiator) dissolved with butyl acetate (1 mL) and CuBr (57 mg, 0.40 mmol; as transition metal catalyst) were added into this solution. Then, the solution was heated to 110° C., while continuing to purge with argon gas.

After 18 hrs polymerization, the polymer solution was diluted with toluene, and then filtered to remove non-dissolved impurities. The polymer was precipitated from the solution by adding methanol, the resulting polymer precipitate was collected and washed in diethyl ether and methanol. The white polymer powder was collected and dried. The yield of polymer was essentially 100%.

The weight average and number average molecular weights were measured by gel permeation chromatography, using a polystyrene standard. The results were Mn=7,580, Mw=8,940. Therefore, the polydispersity of the polymer, Mw/Mn, was 1.16, a very low value.

Production Example 3
Preparation of Charge Transport Homopolymer (TPD Acrylate Type)

The polymerization process of Production Example 2 was repeated with the same reagents and conditions, except that in this case (i) the amount of TPD acrylate used was 6.0 g, 9.73 mmol, (ii) the amount of bipyridine ligand used was 60 mg, 0.384 mmol, and (iii) the amount of ethyl 2-bromo-2-methyl propionate initiator used was 30 mg, 0.154 mmol.

The process yield was again essentially 100%. As before, the weight average and number average molecular weights were measured by gel permeation chromatography, using a polystyrene standard. The results were Mn=13,780, Mw=16,430. The polydispersity Mw/Mn was again below 2, at 1.35.

Production Example 4
Preparation of Non-Linear Optical Homopolymer by Polymerization of Non-Linear-Optical Precursor Monomer Into a four-necked flask equipped with a mechanical stirrer, a nitrogen inlet, a condenser, and a rubber septum were put the non-linear-optical precursor monomer 5-[N-ethyl-N-4-formylphenyl]amino-pentyl acrylate (1.2 g, 4.15 mmol), prepared as described in Example 1, bipyridine (75 mg, 0.48 mmol), and toluene (6 mL). After purging by argon gas for 1 hr, Br-BMP (36 mg, 0.10 mmol) dissolved with toluene (1 mL) and CuBr (29 mg, 0.20 mmol) were added into this solution. The solution was then heated to 110° C., while continuing to purge with argon gas.

The polymerization reaction was allowed to proceed with stirring for another 18 hrs. The resulting polymer solution was diluted with toluene, followed by filtration to remove catalyst-related impurities and polymer precipitation into methanol. The precipitated polymer was collected and washed in methanol. The polymer yield was essentially 100%. As before, the weight average and number average molecular weights were measured by gel permeation chromatography, using a polystyrene standard. The results were Mn=3,510, Mw=8,380, giving a polydispersity of 2.39.

To form the polymer with non-linear-optical capability, the precipitated precursor polymer (400 mg) was dissolved with chloroform (2 mL). Into this solution, dicyanomalonate (110 mg, 1.66 mmol) and dimethylaminopyridine (4 mg, 0.033 mmol) were added, and the reaction was allowed to proceed overnight at 40° C. As before, the polymer was recovered from the solution by filtration of impurities, followed by precipitation into methanol, washing and drying.

Production Example 5
Preparation of B—A—B Type Block Copolymer

A block copolymer of the type B—A—B, where B represents a block having non-linear-optical ability and A represents a block having charge transport ability, was prepared. The A polymer blocks comprised TPD acrylate of the same structure as described in Production Example 2 and Production Example 3 above and the B polymer blocks comprised polyacrylate of the same structure described in Production Example 4 above.

Into a four-necked flask equipped with a mechanical stirrer, a nitrogen inlet, a condenser, and rubber septum were put TPD acrylate (2.07 g, 3.36 mmol), bipyridine (80 mg, 0.512 mmol), and butyl acetate (6 mL). After purging by argon gas for hr, Br-BMP (44 mg, 0.112 mmol) dissolved with butyl acetate (1 ml) and CuBr (35 mg, 0.244 mmol) were added into this solution. The solution was then heated to 110° C., while continuing to purge with argon gas.

Conversion rate (monomer consumption) was checked by H-NMR, in which signal integration ratio of monomer and polymer related signals were used for estimating conversion. After 18 hrs, the conversion rate (monomer consumption) was over 90%.

At this point, the second monomer, 5-[N-ethyl-N-4-formylphenyl]aminopentyl acrylate (the precursor monomer for the non-linear-optical component) (1.6 g, 5.53 mmol) was added. The solution was stirred for another 18 hrs, then diluted with toluene, followed by filtration to remove catalyst-related impurities, and polymer precipitation into methanol. The precipitated polymer was collected and washed in diethyl ether and methanol.

To convert the precursor groups in the B blocks to groups with non-linear-optical ability, the precipitate (1.0 g) was dissolved with CDCl$_3$ (5 mL). Into this solution, dicyanomalonate (200 mg, 3.0 mmol) and dimethylaminopyridine (10 mg, 0.082 mmol) were added, and the resulting solution was stirred overnight at 40° C. The polymerization reaction was allowed to proceed, and the resulting polymer solution was diluted with toluene, followed by filtration to remove catalyst-related impurities and polymer precipitation into methanol. The precipitated polymer was collected and washed in methanol. The polymer yield was essentially 100%.

As before, the weight average and number average molecular weights were measured by gel permeation chromatography, using a polystyrene standard. The results were Mn=9,041, Mw=12,434, giving a polydispersity of 1.38.

Example 1
Preparation of Photorefractive Composition

A photorefractive composition testing sample was prepared. The components of the composition were as follows:

| | |
|---|---|
| (i) Charge Transport Homopolymer (TPD acrylate type) prepared in Production Example 2 | 54.5 wt % |
| (ii) Purchased chromophore powder of 7-DCST | 30 wt % |
| (iii) Purchased ethylcarbazole plasticizer | 15 wt % |
| (iv) Purchased C60 sensitizer MER, Tucson, Az) | 0.5 wt % |

To prepare the composition, the components listed above were dissolved with toluene and stirred overnight at room temperature. After removing the solvent by rotary evaporator and vacuum pump, the residue was scratched and gathered.

To make testing samples, this powdery residue mixture was put on a slide glass and melted at 150° C. to make a 200–300 $\mu$m thickness film, or pre-cake. Small portions of this pre-cake were taken off and sandwiched between indium tin oxide (ITO) coated glass plates separated by a 105 $\mu$m spacer to form the individual samples.

Measurement 1
Diffraction Efficiency

The diffraction efficiency was measured at 633 nm by four-wave mixing experiments. Steady-state and transient four-wave mixing experiments were done using two writing beams making an angle of 20.5 degree in air; with the bisector of the writing beams making an angle of 60 degree relative to the sample normal. The resulting grating period for this geometry was 3.1 $\mu$m; the grating vector was directed at 60 degree relative to the sample normal.

For the four-wave mixing experiments, two s-polarized writing beams with equal intensity of 0.2 W/cm$^2$ in the sample were used; the spot diameter was 600 $\mu$m. A p-polarized beam of 1.7 mW/cm$^2$ counter propagating with respect to the writing beam nearest to the surface normal was used to probe the diffraction gratings; the spot diameter of the probe beam in the sample was 500 $\mu$m. The diffracted and the transmitted probe beam intensities were monitored to determine the diffraction efficiency. The results are given in Table 1.

Measurement 2
Response Time

The diffraction efficiency were measured as a function of the applied field, using a procedure similar to that described in Measurement 1, by four-wave mixing experiments at 633 nm with s-polarized writing beams and a p-polarized probe beam. The angle between the bisector of the two writing beams and the sample normal was 60 degree and the angle between the writing beams was adjusted to provide a 3.1 $\mu$m grating spacing in the material (~20 degree). The writing beams had equal optical powers of 0.45 mW/cm$^2$, leading to a total optical power of 0.5 mW on the polymer, after correction for reflection losses. The beams were collimated to a spot size of approximately 500 $\mu$m. The optical power of the probe was 4 mW. The measurement of the grating buildup time were done as follows: an electric field of 40 V/$\mu$m was applied to the sample, and the sample was illuminated with one of the two writing beams and the probe beam for 100 ms. Then, the evolution of the diffracted beam was recorded. The response time was estimated as the time based on the equation in [0184], in which the smaller number is defined as the response time between $J_1$ and $J_2$.

Measurement 3
Photoconductivity

The photoconductivity of a testing sample was determined. For these measurements, an electric field ($E_a$) was applied by means of a variable high voltage supply, and the resulting current ($i_{dark}$) was measured. To assure steady-state conditions, a dwell time of 15 s between each data reading was used. The applied electric field was swept from 0 to 76 V/$\mu$m over a period of 8 min. The current was measured using a Keithley 6517A electrometer. A computer-controlled set-up allowed a typical noise floor of 1 pA.

To determine the steady state photoconductivity, a single horizontally polarized beam at 633-nm was focused onto the sample. The focused beam had a spot size of 260 $\mu$m. The sample was illuminated at an intensity of 1 W/cm$^2$ over a period of 8 min. while the applied voltage remains fixed. As in the dark conductivity experiments, 16 s dwell time was used between readings. The photoconductivity, $\Phi_{photo}$, was calculated using the following relation:

$$\Phi_{photo} = (i_{photo} - i_{dark})/A_{beam}E_a$$

(where $E_a$ is the applied electric field, $A_{beam}$ is the illuminated area, $i_{photo}$ is electric current with laser irradiation, and $i_{dark}$ is electric current without irradiation) Representative results are given in Table 1.

Example 2

A photorefractive composition was obtained in the same manner as in the Example 1 except that TPD-type homopolymer prepared in Production Example 3 was used and composition ratio was changed to the ratio as described in Table 1. The results of the above measurements 1 to 3 are given in Table 1.

Example 3

A photorefractive composition was obtained in the same manner as in the Example 1 except that B—A—B-type copolymer prepared in Production Example 5 was used, composition ratio was changed to the ratio as described in Table 1, and TPD acrylate monomer as a plascticizer was used instead of ethylcarbazole plasticizer. The results of the above measurements 1 to 3 are given in Table 1.

Example 4
Preparation of Charge Transport Homopolymer (TPD Acrylate Type)

N-[(meth)acroyloxypropylphenyl]-N,N',N'-triphenyl-(1,1'-biphenyl)-4,4'-diamine (TPD acrylate) (6.0 g, 9.7 mmol), bipyridine (60 mg, 0.38 mmol), and butyl acetate (3 mL) were put into a three-necked flask. After purging by argon gas for 1 hour, ethyl 2-bromo-2-methylpropionate (30 mg, 0.154 mmol) dissolved with butyl acetate (1 mL) and CuBr (22 mg, 0.154 mmol) were added into this solution. Then, the solution was heated to 110° C., while continuing to purge with argon gas.

After 18 hrs polymerization, the polymer solution was diluted with toluene, and then filtered to remove non-dissolved impurities. The polymer was precipitated from the solution by adding methanol, the resulting polymer precipitate was collected and washed in diethyl ether and methanol. The white polymer powder was collected and dried the yield of polymer was essentially 100%.

The weight average and number average molecular weights were measured by gel permeation chromatography, using a polystyrene standard. The results were Mn=12,170, Mw=16,430. Therefore, the polydispersity of the polymer, Mw/Mn, was 1.35, a very low value.

A photorefractive composition testing sample was prepared. The components of the composition were as follows:

| | |
|---|---|
| (i) The above charge transport homopolymer | 49.5 wt % |
| (ii) Chromophore powder of 7-DCST | 35 wt % |
| (iii) Purchased ethylcarbazole plasticizer | 15 wt % |
| (iv) Purchased C60 sensitizer (MER, Tucson, AZ) | 0.5 wt % |

The results ,of the above measurements 1 to 3 are given in Table 1.

Example 5
Preparation of Random Copolymer

A random copolymer of charge transport ability and non-linear-optical ability monomers, was prepared. The charge transport ability monomer comprised TPD acrylate of the same -structure as described in Production Examples 2 above and the non-linear-optical ability monomer comprised monomer of the same structure described in Production Example 4 above.

Into a four-necked flask equipped with a mechanical stirrer, a nitrogen inlet, a condenser, and rubber septum were put 5-[N-ethyl-N-4-formylphenyl]amino-pentyl acrylate (the precursor monomer for the non-linear-optical component) (0.55 g, 1.90 mmol), TPD acrylate (2.75 g, 4.46 mmol), , bipyridine (110 mg, 0.70 mmol), and toluene (8 mL). After purging by argon gas for hr, Br-BMP (54 mg, 0.149 mmol) dissolved with butyl acetate (1 mL) and CuBr (43 mg, 0.297 mmol) were added into this solution. The solution was then heated to 90° C., while continuing to purge with argon gas.

Conversion rate (monomer consumption) was checked by H-NMR, in which signal integration ratio of monomer and polymer related signals were used for estimating conversion. After 18 hrs, the conversion rate (monomer consumption) was over 95%.

To convert the precursor groups, the precipitate (3.0 g) was dissolved with CDCl$_3$ (12 mL). Into this solution, dicyanomalonate (570 mg, 8.6 mmol) and dimethylaminopyridine (30 mg, 0.246 mmol) were added, and the resulting solution was stirred overnight at 40° C. The polymerization reaction was allowed to proceed, and the resulting polymer solution was diluted with toluene, followed by filtration to remove catalyst-related impurities and polymer precipitation into methanol. The precipitated polymer was collected and washed in methanol. The polymer yield was essentially 100%.

As before, the weight average and number average molecular weights were measured by gel permeation chromatography, using a polystyrene standard. The results were Mn=9,973, Mw=14,577, giving a polydispersity of 1.46.

A photorefractive composition testing sample was prepared. The components of the composition were as follows:

| | |
|---|---|
| (i) The above copolymer | 59.5 wt % |
| (ii) Chromophore powder of 7-DCST | 29 wt % |
| (iii) Synthesized TPD-Ac | 11 wt % |
| (iv) Purchased C60 sensitizer (MER, Tucson, Az) | 0.5 wt % |

The results of the above measurements 1 to 3 are given in Table 1.

Synthesis of the Above Plascticizer TPD-Ac

The plascticizer TPD-Ac was synthesized from the same intermediate which was used for TPD acrylate synthesis according to the following one-step synthesis scheme:

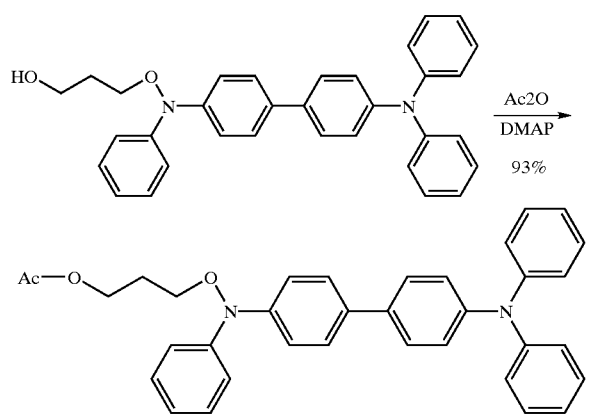

TPD alochol (2.8 g, 5.0 mmol), which was one intermediate for TPD Acrykate monomer, was dissolved with dichloromethane (10 mL). Into this solution, acetic anhydride (0.8 mL, 10.6 mmol) and 4-(Dimethylamino)pyridine (100 mg, 0.82 mmol) were added and stirred at 50° C. for 16 hr. Water (5 mL) was added to the reaction mixture. The products were extracted with dichloromethane (10 mL). After removal of dichloromethane, the crude products were purified by silica gel column chromatography using hexanes-ethyl acetate (1:1) as eluent. The product was collected. Yield (2.97 g, 93%).

Comparative Example 1

A poly(n-vinylcarbazole) (Aldrich Chemicals, Milwaukee, Wis.) was purchased. A photorefractive composition was obtained in the same manner as in the Example 1 except that poly(n-vinylcarbazole) was used and composition ratio was changed to the ratio as described in Table 1. The results of the measurements 1 to 3 are given in Table 1.

TABLE 1

| Sample Number | Example 1 | Example 2 | Example 3 | Example 4 | Example 5 | Comparative Example 1 (Purchased PVK) |
|---|---|---|---|---|---|---|
| Sample composition (wt %): | | | | | | |
| Polymer | 54.5 | 49.5 | 59.5 | 49.5 | 59.5 | 49.5 |
| Chromophore 7-DCST | 30 | 35 | 29 | 35 | 29 | 35 |
| Plasticizer | 15 | 15 | 11 | 15 | 11 | 15 |
| Photoconductivity (pS/cm) | 1,250 | 303 | NA | 1,200 | NA | 11 |

TABLE 1-continued

| Sample Number | Example 1 | Example 2 | Example 3 | Example 4 | Example 5 | Comparative Example 1 (Purchased PVK) |
|---|---|---|---|---|---|---|
| at 40 V/μm and 1 W/cm² Diffraction efficiency | 5 (%) at 40 V/μm | 24 (%) at 40 V/μm | 16.5 (%) at 40 V/μm | 50 (%) at 75 V/μm | 43 (%) at 60 V/μm | 22 (%) at 40 V/μm |
| Peak diffraction efficiency | 70 (%) at 50 V/μm | 60 (%) at 60 V/μm | NA | NA | NA | NA |
| Response time | 31 (ms) at 71 V/μm | 8.4 (ms) at 71 V/μm | 15.7 (ms) at 60 V/μm | 18 (ms) at 75 V/μm | 22 (ms) at 60 V/μm | 50 (ms) at 60 V/μm |

What is claimed is:

1. A polymer which is represented by a formula selected from the group consisting of formulae (I), (II), (III) and (IV):

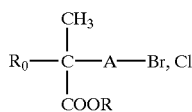
(I)

wherein $R_0$ represents a hydrogen atom or alkyl group with up to 10 carbons; R is selected from the group consisting of a hydrogen atom, a linear alkyl group with up to 10 carbons, a branched alkyl group with up to 10 carbons, and an aromatic group with up to 10 carbons; A represents a repeating structure comprising at least one of the below repeating unit 1 and repeating unit 2;

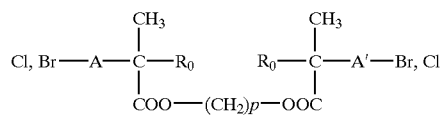
(II)

wherein $R_0$ represents each independently a hydrogen atom or alkyl group with up to 10 carbons; p is an integer of 2 to 6; A and A' represents each independently a repeating structure comprising at least one of the below repeating unit 1 and repeating unit 2;

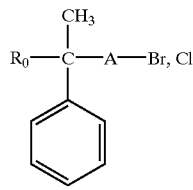
(III)

wherein $R_0$ represents a hydrogen atom or alkyl group with up to 10 carbons; A represents a repeating structure comprising at least one of the below repeating unit 1 and repeating unit 2;

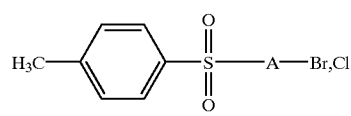
(IV)

wherein A represents a repeating structure comprising at least one of the below repeating unit 1 and repeating unit 2;

repeating unit 1

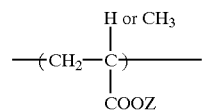

repeating unit 2

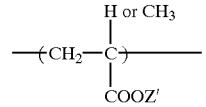

wherein Z is represented by a structure selected from the group consisting of structures (i), (ii) and (iii); and Z' is represented by formula (0);

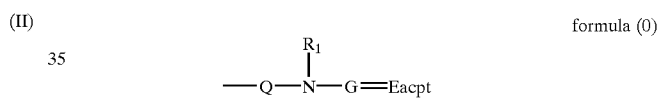
formula (0)

wherein Q represents an alkylene group, with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of conjugated bond; and Eacpt is an electron acceptor group;

wherein the structures (i), (ii) and (iii) are:

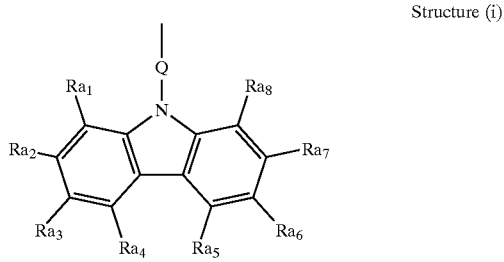
Structure (i)

wherein Q represents an alkylene group, with or without a hetero atom; $Ra_1$, $Ra_2$, $Ra_3$, $Ra_4$, $Ra_5$, $Ra_6$, $Ra_7$, and $Ra_8$ are independently selected from the group consisting of a hydrogen atom, a linear alkyl group with up to 10 carbons, a branched alkyl group with up to 10 carbons, and an aromatic group with up to 10 carbons;

Structure (ii)

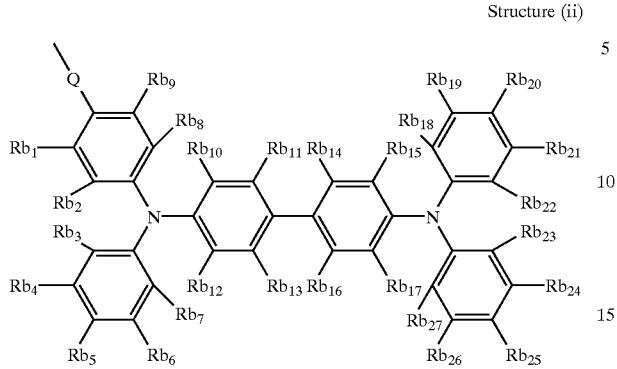

wherein Q represents an alkylene group, with or without a hetero atom; $Rb_1$–$Rb_{27}$ are each independently selected from the group consisting of a hydrogen atom, a linear alkyl group with up to 10 carbons, a branched alkyl group with up to 10 carbons, and an aromatic group with up to 10 carbons;

Structure (iii)

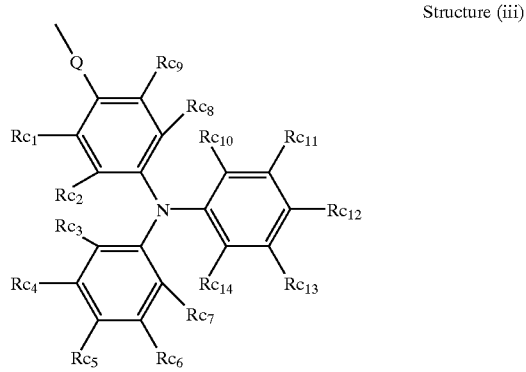

wherein Q represents an alkylene group, with or without a hetero atom; $Rc_1$–$Rc_{14}$ are each independently selected from the group consisting of a hydrogen atom, a linear alkyl group with up to 10 carbons, a branched alkyl group with up to 10 carbons, and an aromatic group with up to 10 carbons.

2. The polymer of claim 1, wherein G in formula (0) is represented by a structure selected from the group consisting of the structures (iv), (v) and (vi);

wherein structures (iv), (v) and (vi) are:

Structure (iv)

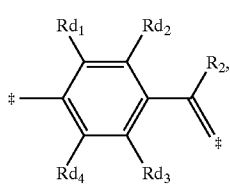

Structure (v)

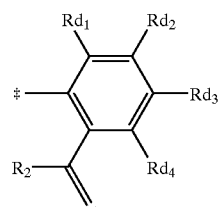

wherein, in both structures (iv) and (v), $Rd_1$–$Rd_4$ are each independently selected from the group consisting of a hydrogen atom, a linear alkyl group with up to 10 atoms, a branched alkyl group with up to 10 atoms, and an aromatic group with up to 10 carbons; $R_2$ is selected from the group consisting of a hydrogen atom, a linear alkyl group with up to 10 atoms, a branched alkyl group with up to 10 atoms, and an aromatic group with up to 10 carbons;

Structure (vi)

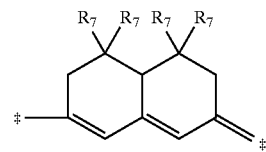

wherein $R_7$ represents a linear or branched alkyl group with up to 10 carbons; and wherein Eacpt in formula (0) is an electron acceptor group and represented by a structure selected from the group consisting of the structures;

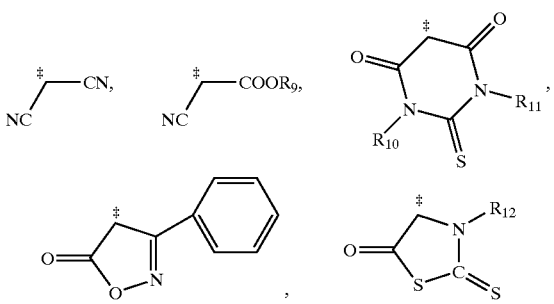

wherein $R_9$, $R_{10}$, $R_{11}$, and $R_{12}$ are each independently selected from the group consisting of a hydrogen atom, a linear alkyl group with up to 10 atoms, a branched alkyl group with up to 10 atoms, and an aromatic group with up to 10 carbons.

3. The polymer of claim 1, wherein the formulae (I), (II), (III) and (IV) represent the following formulae (Ia), (IIa), (IIIa) and (IVa), respectively:

(Ia)

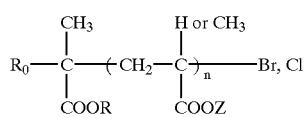

wherein $R_0$, R and Z are the same meaning as in formula (I); and n is an integer of 10 to 10,000;

(IIa)
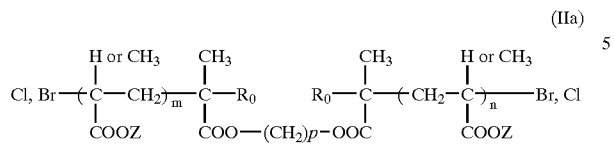

wherein $R_0$, R and Z are the same meaning as in formula (II); and m and n are an integer of 5 to 10,000, respectively;

(IIIa)
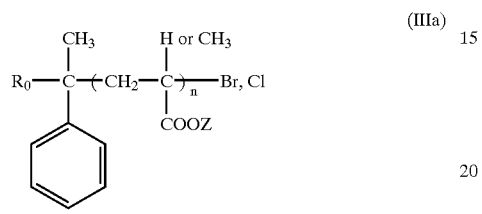

wherein $R_0$ and Z are the same meaning as in formula (III); and n is an integer of 10 to 10,000;

(IVa)
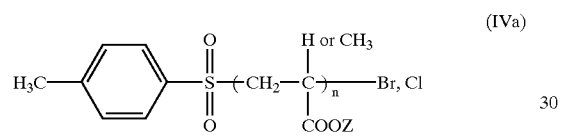

wherein Z is the same meaning as in formula (IV); and n is an integer of 10 to 10,000.

4. The polymer of claim 1, wherein the formulae (I), (II), (III) and (IV) represent the following formulae (Ib), (IIb), (IIIb) and (IVb), respectively:

(Ib)
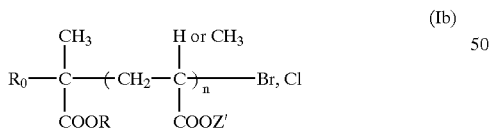

wherein $R_0$, R and Z' are the same meaning as in formula (I); and n is an integer of 10 to 10,000;

(IIb)
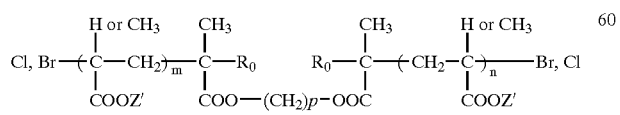

wherein $R_0$, R and Z' are the same meaning as in formula (II); and m and n are an integer of 5 to 10,000, respectively;

(IIIb)
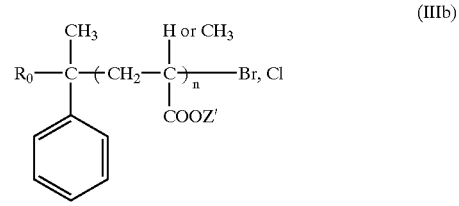

wherein $R_0$ and Z' are the same meaning as in formula (III); and n is an integer of 10 to 10,000;

(IVb)
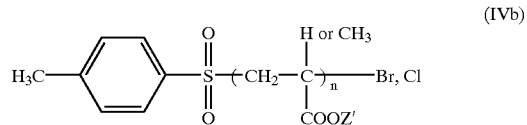

wherein Z' is the same meaning as in formula (IV); and n is an integer of 10 to 10,000.

5. The polymer of claim 1, wherein the formulae (I), (II), (III) and (IV) represent the following formulae (Ic), (IIc), (IIIc) and (IVc), respectively:

(Ic)
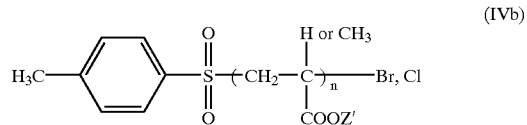

wherein $R_0$, R, Z and Z' are the same meaning as in formula (I); x is an integer of 5 to 10,000; and y is an integer of 5 to 10,000;

(IIc)
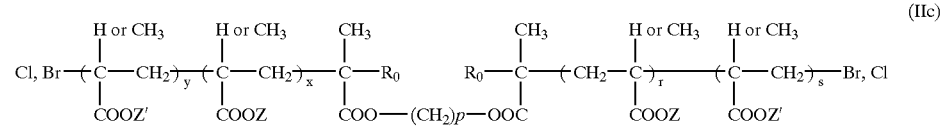

wherein $R_0$, R, Z and Z' are the same meaning as in formula (II); x is an integer of 5 to 10,000; y is an integer of 5 to 10,000; r is an integer of 5 to 10,000; and s is an integer of 5 to 10,000;

(IIIc)
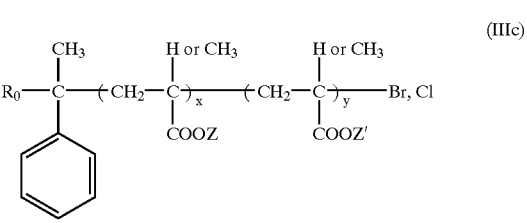

wherein $R_0$, Z and Z' are the same meaning as in formula (III); and x is an integer of 5 to 10,000; and y is an integer of 5 to 10,000;

(IVc)
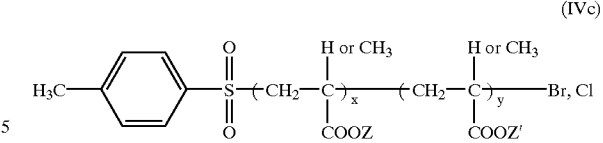

wherein Z and Z' are the same meaning as in formula (IV); and x is an integer of 5 to 10,000; and y is an integer of 5 to 10,000.

6. The polymer of claim 1, wherein the polymer has a glass transition temperature of about 125° C. or less.

7. The polymer of claim 1, wherein the polymer has a polydispersity of about 2.5 or less.

8. A method for producing a polymer comprising polymerizing a monomer by a living radical polymerization technique, wherein the monomer comprises a structure selected from the group consisting of structures (i), (ii) and (iii):

Structure (i)

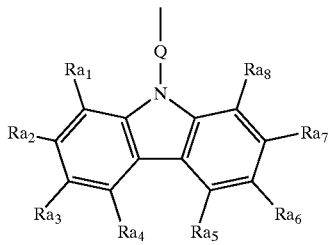

wherein Q represents an alkylene group, with or without a hetero atom; $Ra_1$, $Ra_2$, $Ra_3$, $Ra_4$, $Ra_5$, $Ra_6$, $Ra_7$, and $Ra_8$ are independently selected from the group consisting of a hydrogen atom, a linear alkyl group with up to 10 carbons, a branched alkyl group with up to 10 carbons, and an aromatic group with up to 10 carbons;

Structure (ii)

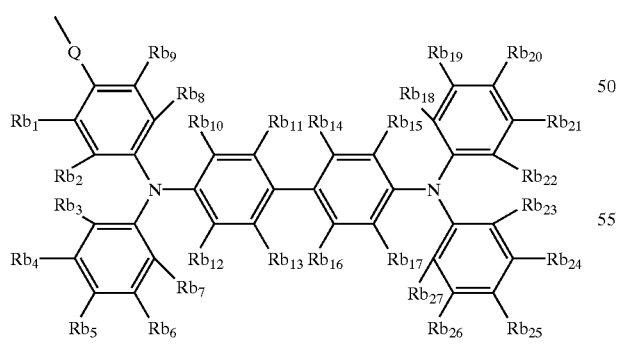

wherein Q represents an alkylene group, with or without a hetero atom; $Rb_1$–$Rb_{27}$ are each independently selected from the group consisting of a hydrogen atom, a linear alkyl group with up to 10 carbons, a branched alkyl group with up to 10 carbons, and an aromatic group with up to 10 carbons;

Structure (iii)

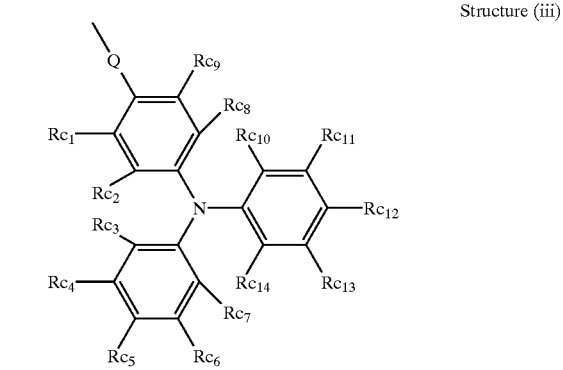

wherein Q represents an alkylene group, with or without a hetero atom; $Rc_1$–$Rc_{14}$ are each independently selected from the group consisting of a hydrogen atom, a linear alkyl group with up to 10 carbons, a branched alkyl group with up to 10 carbons, and an aromatic group with up to 10 carbons.

9. The method of claim 8, wherein the polymer is represented by a formula selected from the group consisting of the formulae (Ia), (IIa), (IIIa) and (IVa) set forth in claim 3.

10. The method of claim 8, wherein the living radical polymerization technique comprises contacting the monomer with a transition metal catalyst selected from the group consisting of copper bromide and copper chloride.

11. The method of claim 8, wherein the living radical polymerization technique comprises contacting the monomer with a polymerization initiator selected from the group consisting of α-halogenated ester and α-halogenated styrene.

12. The method of claim 10, wherein the living radical polymerization technique comprises contacting the transition metal with a ligand selected from the group consisting of bipyridines, mercaptans, and trifluorates.

13. A method for producing a polymer comprising polymerizing a monomer by a living radical polymerization technique, wherein the monomer comprises a structure represented by the formula (0);

formula (0)

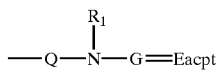

wherein Q represents an alkylene group, with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of conjugated bond; and Eacpt is an electron acceptor group.

14. The method of claim 13, wherein G in formula (0) is represented by a structure selected from the group consisting of the structures (iv), (v) and (vi);

wherein structures (iv), (v) and (vi) are:

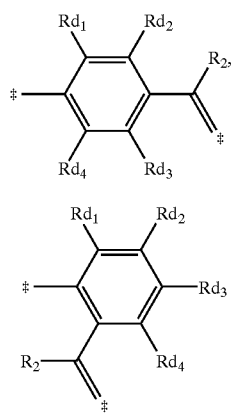

Structure (iv)

Structure (v)

wherein, in both structures (iv) and (v), $Rd_1$–$Rd_4$ are each independently selected from the group consisting of a hydrogen atom, a linear alkyl group with up to 10 atoms, a branched alkyl group with up to 10 atoms, and an aromatic group with up to 10 carbons; $R_2$ is selected from the group consisting of a hydrogen atom, a linear alkyl group with up to 10 atoms, a branched alkyl group with up to 10 atoms, and an aromatic group with up to 10 carbons;

Structure (vi)

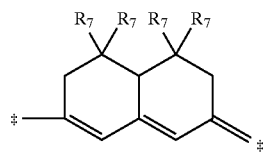

wherein $R_7$ represents a linear or branched alkyl group with up to 10 carbons; and
wherein Eacpt in formula (0) is an electron acceptor group and represented by a structure selected from the group consisting of the structures;

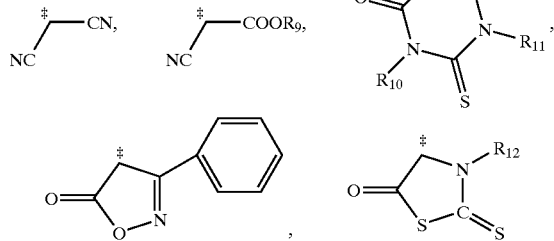

wherein $R_9$, $R_{10}$, $R_{11}$, and $R_{12}$ are each independently selected from the group consisting of a hydrogen atom, a linear alkyl group with up to 10 atoms, a branched alkyl group with up to 10 atoms, and an aromatic group with up to 10 carbons.

15. The method of claim 13, wherein the polymer is represented by a formula selected from the group consisting of the formulae (Ib), (IIb), (IIIb) and (IVb) set forth in claim 4.

16. The method of claim 13, wherein the living radical polymerization technique comprises contacting the monomer with a transition metal catalyst selected from the group consisting of copper bromide and copper chloride.

17. The method of claim 13, wherein the living radical polymerization technique comprises contacting the monomer with a polymerization initiator selected from the group consisting of α-halogenated ester and α-halogenated styrene.

18. The method of claim 16, wherein the living radical polymerization technique comprises contacting the transition metal with a ligand selected from the group consisting of bipyridines, mercaptans, and trifluorates.

19. A method for producing a polymer comprising
copolymerizing at least a first monomer and a second monomer by a living radical polymerization technique, wherein the first monomer comprises a structure selected from the group consisting of structures (i), (ii) and (iii):

Structure (i)

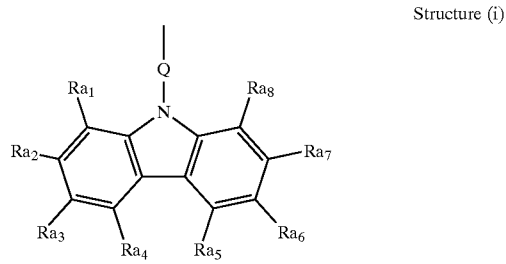

wherein Q represents an alkylene group, with or without a hetero atom; $Ra_1$, $Ra_2$, $Ra_3$, $Ra_4$, $Ra_5$, $Ra_6$, $Ra_7$, and $Ra_8$ are independently selected from the group consisting of a hydrogen atom, a linear alkyl group with up to 10 carbons, a branched alkyl group with up to 10 carbons, and an aromatic group with up to 10 carbons;

Structure (ii)

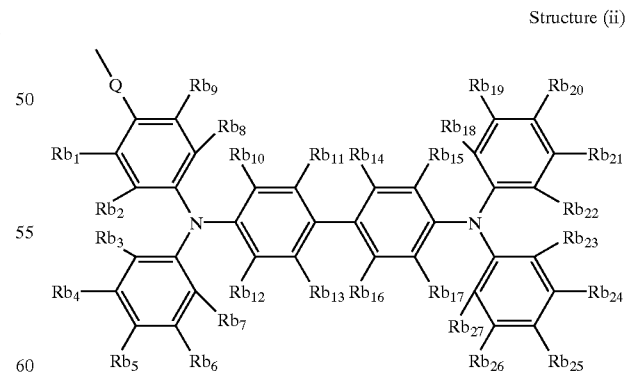

wherein Q represents an alkylene group, with or without a hetero atom; $Rb_1$–$Rb_{27}$ are each independently selected from the group consisting of a hydrogen atom, a linear alkyl group with up to 10 carbons, a branched alkyl group with up to 10 carbons, and an aromatic group with up to 10 carbons;

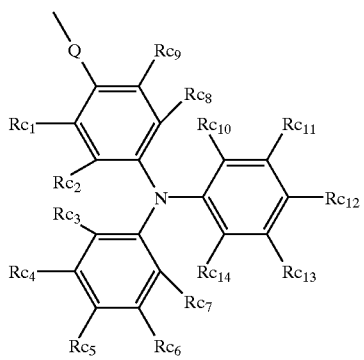

Structure (iii)

wherein Q represents an alkylene group, with or without a hetero atom; $Rc_1$–$Rc_{14}$ are each independently selected from the group consisting of a hydrogen atom, a linear alkyl group with up to 10 carbons, a branched alkyl group with up to 10 carbons, and an aromatic group with up to 10 carbons; and wherein the second monomer comprises a structure represented by the formula (0):

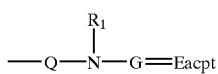

formula (0)

wherein Q represents an alkylene group, with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of conjugated bond; and Eacpt is an electron acceptor group.

20. The method of claim 19, wherein G in formula (0) is represented by a structure selected from the group consisting of the structures (iv), (v) and (vi);

wherein structures (iv), (v) and (vi) are:

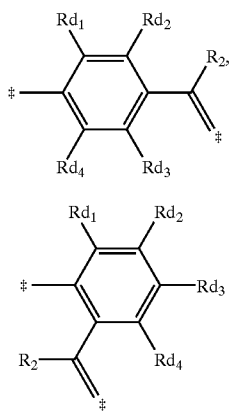

wherein, in both structures (iv) and (v), $Rd_1$–$Rd_4$ are each independently selected from the group consisting of a hydrogen atom, a linear alkyl group with up to 10 atoms, a branched alkyl group with up to 10 atoms, and an aromatic group with up to 10 carbons; $R_2$ is selected from the group consisting of a hydrogen atom, a linear alkyl group with up to 10 atoms, a branched alkyl group with up to 10 atoms, and an aromatic group with up to 10 carbons;

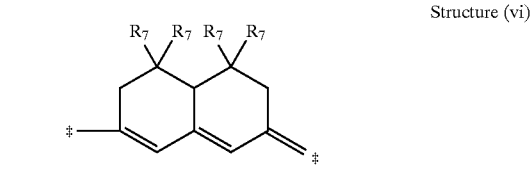

Structure (vi)

wherein $R_7$ represents a linear or branched alkyl group with up to 10 carbons; and wherein Eacpt in formula (0) is an electron acceptor group and represented by a structure selected from the group consisting of the structures;

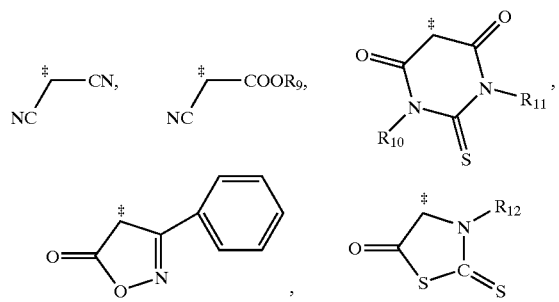

wherein $R_9$, $R_{10}$, $R_{11}$, and $R_{12}$ are each independently selected from the group consisting of a hydrogen atom, a linear alkyl group with up to 10 atoms, a branched alkyl group with up to 10 atoms, and an aromatic group with up to 10 carbons.

21. The method of claim 20, wherein the polymer is represented by a formula selected from the group consisting of the formulae (Ic), (IIc), (IIIc) and (IVc) set forth in claim 5.

22. The method of claim 20, wherein the living radical polymerization technique comprises contacting the monomer with a transition metal catalyst selected from the group consisting of copper bromide and copper chloride.

23. The method of claim 20, wherein the living radical polymerization technique comprises contacting the monomer with a polymerization initiator selected from the group consisting of α-halogenated ester and α-halogenated styrene.

24. The method of claim 22, wherein the living radical polymerization technique comprises contacting the transition metal with a ligand selected from the group consisting of bipyridines, mercaptans, and trifluorates.

25. A composition comprising a sensitizer and a polymer according to claim 1, wherein the composition exhibits photorefractive ability.

26. The composition of claim 25, wherein the composition has a photoconductivity of 100 pS/cm or more.

27. The composition of claim 25, wherein the polymer has a polydispersity of about 2.5 or less.

28. The composition of claim 25, wherein the polymer has a glass transition temperature about 125° C. or less.

29. The composition of claim 25, wherein the composition has a response time of no longer than about 50 milliseconds as measured under an electric field of no greater than about 60 V/μm.

30. The composition of claim 25, further comprising a plasticizer.

31. A composition comprising a polymer prepared by living radical polymerization, wherein:

(a) the living radical polymerization is carried out using a monomer, a polymerization initiator, transition metal catalyst and a ligand capable of reversibly forming a complex with the transition metal catalyst, (b) the polymer comprises at least one of a first repeat unit including a moiety having charge transport ability and a second repeat unit including a moiety having non-linear-optical ability, and (c) the composition exhibits photorefractive ability.

32. The composition of claim 31, wherein the moiety having charge transport ability is selected from the group consisting of the structures (i), (ii) and (iii):

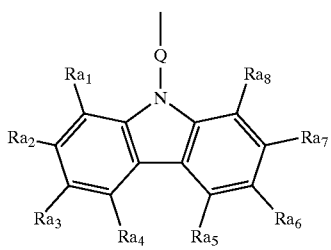

Structure (i)

wherein Q represents an alkylene group, with or without a hetero atom; $Ra_1$, $Ra_2$, $Ra_3$, $Ra_4$, $Ra_5$, $Ra_6$, $Ra_7$, and $Ra_8$ are independently selected from the group consisting of a hydrogen atom, a linear alkyl group with up to 10 carbons, a branched alkyl group with up to 10 carbons, and an aromatic group with up to 10 carbons;

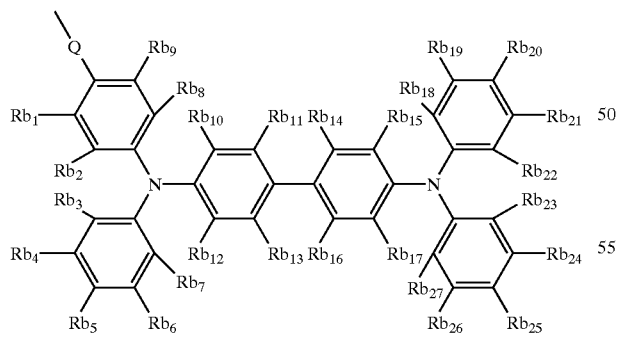

Structure (ii)

wherein Q represents an alkylene group, with or without a hetero atom; $Rb_1$–$Rb_{27}$ are each independently selected from the group consisting of a hydrogen atom, a linear alkyl group with up to 10 carbons, a branched alkyl group with up to 10 carbons, and an aromatic group with up to 10 carbons;

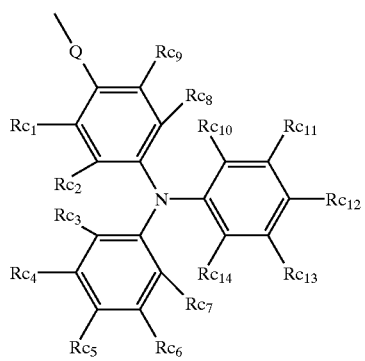

Structure (iii)

wherein Q represents an alkylene group, with or without a hetero atom; $Rc_1$–$Rc_{14}$ are each independently selected from the group consisting of a hydrogen atom, a linear alkyl group with up to 10 carbons, a branched alkyl group with up to 10 carbons, and an aromatic group with up to 10 carbons.

33. The composition of claim 31, wherein the moiety having non-linear-optical ability is represented by the formula (0);

formula (0)

wherein Q represents an alkylene group, with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; and Eacpt is an electron acceptor group.

34. The method of claim 33, wherein G in formula (0) is represented by a structure selected from the group consisting of the structures (iv), (v) and (vi);

wherein structures (iv), (v) and (vi) are:

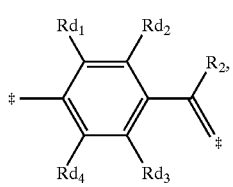

Structure (iv)

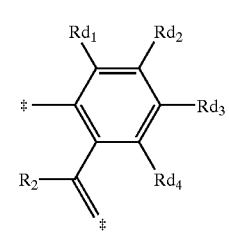

Structure (v)

wherein, in both structures (iv) and (v), $Rd_1$–$Rd_4$ are each independently selected from the group consisting of a hydrogen atom, a linear alkyl group with up to 10 atoms, a branched alkyl group with up to 10 atoms, and an aromatic group with up to 10 carbons; $R_2$ is selected from the group consisting of a hydrogen atom, a linear alkyl group with up to 10 atoms, a branched alkyl group with up to 10 atoms, and an aromatic group with up to 10 carbons;

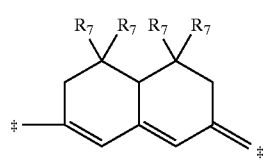

Structure (vi)

wherein $R_7$ represents a linear or branched alkyl group with up to 10 carbons; and wherein Eacpt is an electron acceptor group and represented by a structure selected from the group consisting of the structures;

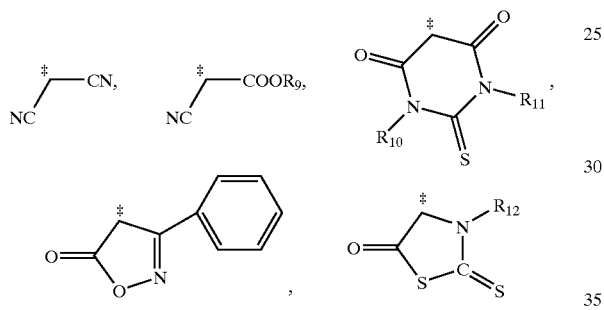

wherein $R_9$, $R_{10}$, $R_{11}$, and $R_{12}$ are each independently selected from the group consisting of a hydrogen atom, a linear alkyl group with up to 10 atoms, a branched alkyl group with up to 10 atoms, and an aromatic group with up to 10 carbons.

35. The composition of claim 31, wherein the moiety having charge transport ability is selected from the group consisting of the structures (i), (ii) and (iii) and the moiety having non-linear-optical ability is represented by the formula (0);

wherein the structures (i), (ii) and (iii) are:

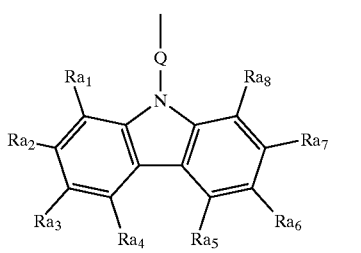

Structure (i)

wherein Q represents an alkylene group, with or without a hetero atom; $Ra_1$, $Ra_2$, $Ra_3$, $Ra_4$, $Ra_5$, $Ra_6$, $Ra_7$, and $Ra_8$ are independently selected from the group consisting of a hydrogen atom, a linear alkyl group with up to 10 carbons, a branched alkyl group with up to 10 carbons, and an aromatic group with up to 10 carbons;

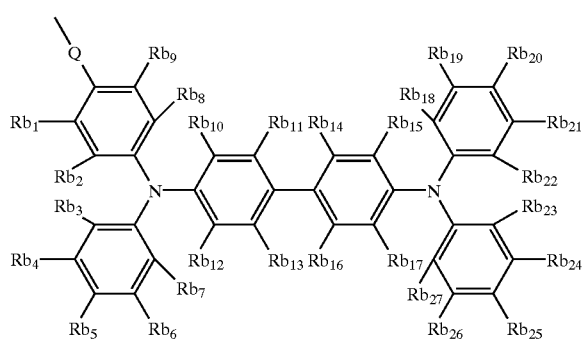

Structure (ii)

wherein Q represents an alkylene group, with or without a hetero atom; $Rb_1$–$Rb_{27}$ are each independently selected from the group consisting of a hydrogen atom, a linear alkyl group with up to 10 carbons, a branched alkyl group with up to 10 carbons, and an aromatic group with up to 10 carbons;

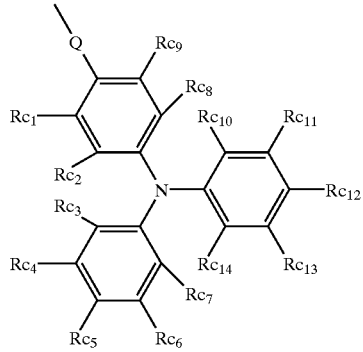

Structure (iii)

wherein Q represents an alkylene group, with or without a hetero atom; $Rc_1$–$Rc_{14}$ are each independently selected from the group consisting of a hydrogen atom, a linear alkyl group with up to 10 carbons, a branched alkyl group with up to 10 carbons, and an aromatic group with up to 10 carbons;

wherein the formula (0) is:

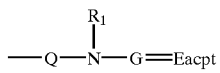

formula (0)

wherein Q represents an alkylene group, with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of $7\pi$-conjugated bond; and Eacpt is an electron acceptor group.

36. The method of claim 35, wherein G in formula (0) is represented by a structure selected from the group consisting of the structures (iv), (v) and (vi);

wherein structures (iv), (v) and (vi) are:

Structure (iv)

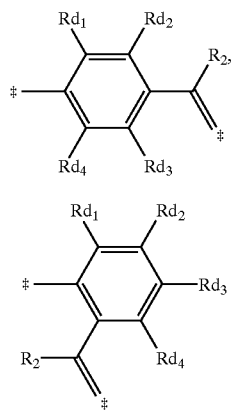

Structure (v)

wherein, in both structures (iv) and (v), $Rd_1$–$Rd_4$ are each independently selected from the group consisting of a hydrogen atom, a linear alkyl group with up to 10 atoms, a branched alkyl group with up to 10 atoms, and an aromatic group with up to 10 carbons; $R_2$ is selected from the group consisting of a hydrogen atom, a linear alkyl group with up to 10 atoms, a branched alkyl group with up to 10 atoms, and an aromatic group with up to 10 carbons;

Structure (vi)

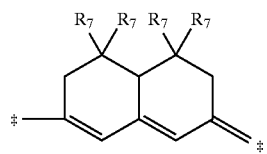

wherein $R_7$ represents a linear or branched alkyl group with up to 10 carbons; and wherein Eacpt in formula (0) is an electron acceptor group and represented by a structure selected from the group consisting of the structures;

Structure (iv)

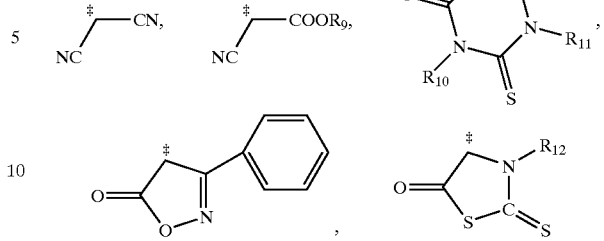

wherein $R_9$, $R_{10}$, $R_{11}$, and $R_{12}$ are each independently selected from the group consisting of a hydrogen atom, a linear alkyl group with up to 10 atoms, a branched alkyl group with up to 10 atoms, and an aromatic group with up to 10 carbons.

37. The composition of claim 31, wherein the composition has a photoconductivity of 100 pS/cm or more.

38. The composition of claim 31, wherein the monomer is an acrylate-based monomer.

39. The composition of claim 31, wherein the transition metal catalyst is selected from the group consisting of copper bromide and copper chloride.

40. The method of claim 31, wherein the polymerization initiator is selected from the group consisting of α-halogenated ester and α-halogenated styrene.

41. The method of claim 31, wherein the ligand is selected from the group consisting of bipyridines, mercaptans, and trifluorates.

42. The composition of claim 31, further comprising a plasticizer.

43. The composition of claim 31, further comprising a sensitizer.

44. The composition of claim 31, wherein the polymer has a polydispersity of about 2.5 or less.

45. The composition of claim 31, wherein the polymer has a glass transition temperature of about 125° C. or less.

46. The composition of claim 31, wherein the composition has a response time of no longer than about 50 milliseconds as measured under an electric field of no greater than about 60 V/μm.

* * * * *

UNITED STATES PATENT AND TRADEMARK OFFICE
CERTIFICATE OF CORRECTION

PATENT NO.   : 6,610,809 B1                                              Page 1 of 1
DATED        : August 26, 2003
INVENTOR(S)  : Michiharu Yamamoto et al.

It is certified that error appears in the above-identified patent and that said Letters Patent is hereby corrected as shown below:

<u>Column 54,</u>
Line 41, delete "method" and insert -- composition --;

<u>Column 56,</u>
Line 64, delete "method" and insert -- composition --;

<u>Column 58,</u>
Lines 26 and 29, delete "method" and insert -- composition --.

Signed and Sealed this

Thirtieth Day of March, 2004

JON W. DUDAS
*Acting Director of the United States Patent and Trademark Office*